United States Patent
Myung et al.

(10) Patent No.: US 12,267,139 B2
(45) Date of Patent: Apr. 1, 2025

(54) METHOD OF TRANSMITTING AND RECEIVING SIGNAL IN UNLICENSED BAND AND APPARATUS THEREFOR

(71) Applicant: LG Electronics Inc., Seoul (KR)

(72) Inventors: Sechang Myung, Seoul (KR); Seonwook Kim, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/993,314

(22) Filed: Nov. 23, 2022

(65) Prior Publication Data
US 2023/0093200 A1    Mar. 23, 2023

Related U.S. Application Data

(63) Continuation of application No. PCT/KR2022/011287, filed on Aug. 1, 2022.

(30) Foreign Application Priority Data

Aug. 5, 2021  (KR) .......................... 10-2021-0103450
Nov. 3, 2021  (KR) .......................... 10-2021-0150071

(51) Int. Cl.
*H04B 7/06* (2006.01)
(52) U.S. Cl.
CPC .................................. *H04B 7/0695* (2013.01)
(58) Field of Classification Search
CPC .... H04B 7/0695; H04B 7/0639; H04B 7/088; H04B 7/0408; H04W 74/0808; H04W 16/14; H04W 16/28
See application file for complete search history.

(56) References Cited

U.S. PATENT DOCUMENTS

| 11,659,569 B2* | 5/2023 | Ma .......................... H04L 1/0013 370/329 |
| 2018/0115996 A1 | 4/2018 | Si et al. |
| 2019/0141747 A1 | 5/2019 | Bang et al. |
| 2020/0213863 A1* | 7/2020 | Wu .......................... H04L 1/1812 |
| 2020/0252806 A1 | 8/2020 | Yerramalli et al. |
| 2020/0267736 A1 | 8/2020 | Hafeez et al. |
| 2021/0045158 A1* | 2/2021 | Yerramalli ............. H04L 1/0003 |
| 2021/0250776 A1* | 8/2021 | Yerramalli ............. H04W 16/14 |
| 2021/0392683 A1* | 12/2021 | Awadin .................. H04B 7/088 |

(Continued)

FOREIGN PATENT DOCUMENTS

KR         10-2262968         6/2021

OTHER PUBLICATIONS

Huawei et al., "Channel access mechanism for 60 GHz unlicensed operation," R1-2104275, Presented at 3GPP TSG RAN WG1 Meeting #105-e, E-meeting, May 10-27, 2021, 26 pages.

(Continued)

*Primary Examiner* — Kenneth T Lam
(74) *Attorney, Agent, or Firm* — Fish & Richardson P.C.

(57) ABSTRACT

Disclosed is a method of performing an uplink (UL) transmission by a user equipment (UE) in a wireless communication system. Specifically, the method comprises performing sensing on a plurality of beams, wherein each of the plurality of beams is sensed independently; performing the UL transmission through at least one beam sensed to be idle among the plurality of beams, wherein counter values for the each of the plurality of beams are set independently.

10 Claims, 16 Drawing Sheets

(56) References Cited

U.S. PATENT DOCUMENTS

| | | | |
|---|---|---|---|
| 2022/0046702 A1* | 2/2022 | Hu | H04W 74/0808 |
| 2022/0124806 A1* | 4/2022 | Hu | H04W 72/046 |
| 2022/0174743 A1* | 6/2022 | Wu | H04W 16/14 |
| 2023/0010816 A1* | 1/2023 | Falkenberg | H04W 76/20 |
| 2023/0354419 A1* | 11/2023 | Yang | H04W 74/0808 |

OTHER PUBLICATIONS

Intel Corporation, "Uplink transmission with LBT," R2-151102, Presented at 3GPP TSG-RAN WG2 #89bis, Bratislava, Slovakia, Apr. 20-24, 2015, 6 pages.

International Search Report in International Appln. No. PCT/KR2022/011287, mailed on Nov. 16, 2022, 11 pages (with English translation).

LG Electronics, "Channel access procedure for NR-U," R1-1900606, Presented at 3GPP TSG RAN WG1 Ad-Hoc Meeting 1901, Taipei, Taiwan, Jan. 21-25, 2019, 11 pages.

LG Electronics, "UL LBT design in LAA," R1-156858, Presented at 3GPP TSG RAN WG1 Meeting #83, Anaheim, USA, Nov. 15-22, 2015, 6 pages.

Samsung, "Channel access mechanism for NR from 52.6 GHz to 71 GHz," R1-2103234, Presented at 3GPP TSG RAN WG1 #104b-e, e-Meeting, Apr. 12-20, 2021, 9 pages.

Search Report in Korean Appln. No. 10-2022-7040220, dated Nov. 24, 2022, 11 pages (with English translation).

ZTE Microelectronics Technology et al., "Discussion on the UL LBT for LAA," R1-162328, Presented at 3GPP TSG RAN WG1 Meeting #84bis, Busan, Korea, Apr. 11-15, 2016, 7 pages.

Catt, "Channel access mechanism for up to 71GHz operation," 3GPP TSG RAN WG1 #105-e, R1-2104510, e-Meeting, May 19-27, 2021, 12 pages.

Coolpad, "Views on UL LBT scheme," 3GPP TSG RAN WG1 Meeting #84, R1-160963, St Julian's, Malta, Feb. 15-19, 2016, 5 pages.

Extended European Search Report in European Appln. No. 22800558.3, mailed on Aug. 24, 2023, 9 pages.

Huawei, HiSilicon, "SLS evaluation of LBT for short control signaling," 3GPP TSG RAN WG1 Meeting #98, R1-1909310, Prague, Czech Republic, Aug. 26-30, 2019, 10 pages.

Office Action in Japanese Appln. No. 2022-574195, mailed on Sep. 26, 2023, 9 pages (with English translation).

Samsung, "Channel access mechanism for NR from 52.6 GHz to 71 GHz," 3GPP TSG RAN WG1 #105-e, R1-2105300, e-Meeting, May 10-27, 2021, 10 pages.

* cited by examiner

Uplink Tx procedure based on dynamic grant

Uplink Tx procedure based on configured grant

Carrier aggregation between L-band and U-band

Standalone U-band(s)

METHOD OF TRANSMITTING AND RECEIVING SIGNAL IN UNLICENSED BAND AND APPARATUS THEREFOR

CROSS-REFERENCE TO RELATED APPLICATIONS

This application is a continuation of International Application No. PCT/KR2022/011287, filed on Aug. 1, 2022, which claims the benefit of Korean Application Nos. 10-2021-0150071, filed on Nov. 3, 2021, and 10-2021-0103450, filed on Aug. 5, 2021. The disclosures of the prior applications are incorporated by reference in their entirety.

TECHNICAL FIELD

The present disclosure relates to a method of transmitting and receiving signals in an unlicensed band and an apparatus therefor and, more particularly, to a method of performing listen-before-talk (LBT) for at least one beam to transmit and receive signals using the at least one beam in an unlicensed band and an apparatus therefor.

BACKGROUND

As more and more communication devices demand larger communication traffic along with the current trends, a future-generation 5th generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra-high reliability, ultra-low latency, and ultra-high availability (e.g., vehicle to everything (V2X), emergency service, and remote control), and mMTC is a future-generation mobile communication scenario characterized by low cost, low energy, short packet, and massive connectivity (e.g., Internet of things (IoT)).

SUMMARY

An object of the present disclosure is to provide a method of transmitting and receiving a signal in an unlicensed band and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

According to an aspect of the present disclosure, provided herein is a method of performing an uplink (UL) transmission by a user equipment (UE) in a wireless communication system, comprising performing sensing on a plurality of beams, wherein each of the plurality of beams is sensed independently; performing the UL transmission through at least one beam sensed to be idle among the plurality of beams, wherein counter values for the each of the plurality of beams are set independently.

The sensing on the plurality of beams are performed, simultaneously

The sensing on the plurality of beams is first type sensing, wherein the performing the UL transmission is further comprising: based on (i) a first beam among the plurality of beams being sensed to be idle based on the first type sensing before a transmission time of the UL transmission corresponding to the first beam and (ii) the UL transmission has not performed after the first type sensing: performing second type sensing on the first beam during a duration immediately before the transmission time; and performing the UL transmission based on that the first beam is sensed to be idle based on the second type sensing.

The first type sensing is based on Random back-off counter, and wherein the second type sensing is not based on Random back-off counter.

The method further comprising: based on the first beam being sensed to be busy based on the second type sensing, performing the first type sensing on the first beam.

Each of the plurality of beams corresponds to an UL transmission among a plurality of UL transmissions, and wherein the plurality of UL transmissions is scheduled at the same time.

In another aspect of the present disclosure, provided herein is a user equipment (UE) for performing an uplink (UL) transmission in a wireless communication system, comprising: at least one transceiver; at least one processor; and at least one memory operably connected to the at least one processor and configured to store instructions that, when executed, cause the at least one processor to perform operations. The operation may comprise: performing sensing on a plurality of beams, wherein each of the plurality of beams is sensed independently; performing, through at least one transceiver, the UL transmission through at least one beam sensed to be idle among the plurality of beams, wherein counter values for the each of the plurality of beams are set independently.

The sensing on the plurality of beams are performed, simultaneously.

The sensing on the plurality of beams is first type sensing, wherein the performing the UL transmission is further comprising: based on (i) a first beam among the plurality of beams being sensed to be idle based on the first type sensing before a transmission time of the UL transmission corresponding to the first beam and (ii) the UL transmission has not performed after the first type sensing: performing second type sensing on the first beam during a duration immediately before the transmission time; and performing the UL transmission based on that the first beam is sensed to be idle based on the second type sensing.

The first type sensing is based on Random back-off counter, and wherein the second type sensing is not based on Random back-off counter.

The method further comprising: based on the first beam being sensed to be busy based on the second type sensing, performing the first type sensing on the first beam.

Each of the plurality of beams corresponds to an UL transmission among a plurality of UL transmissions, and wherein the plurality of UL transmissions is scheduled at the same time.

In another aspect of the present disclosure, provided herein is an apparatus for performing an uplink (UL) transmission in a wireless communication system, comprising: at least one processor; and at least one memory operably connected to the at least one processor and configured to store instructions that, when executed, cause the at least one processor to perform operations. The operations may comprise: performing sensing on a plurality of beams, wherein each of the plurality of beams is sensed independently; performing the UL transmission through at least one beam sensed to be idle among the plurality of beams, wherein counter values for the each of the plurality of beams are set independently.

In another aspect of the present disclosure, provided herein is a computer-readable storage medium including at least one computer program causing at least one processor to perform an operation. The operation may comprise: performing sensing on a plurality of beams, wherein each of the plurality of beams is sensed independently; performing the UL transmission through at least one beam sensed to be idle among the plurality of beams, wherein counter values for the each of the plurality of beams are set independently.

In another aspect of the present disclosure, provided herein is a method of performing a downlink (DL) transmission by a base station (BS) in a wireless communication system, comprising: performing sensing on a plurality of beams, wherein each of the plurality of beams is sensed independently; performing the DL transmission through at least one beam sensed to be idle among the plurality of beams, wherein counter values for the each of the plurality of beams are set independently.

In another aspect of the present disclosure, provided herein is a base station (BS) for performing a downlink (DL) transmission in a wireless communication system, comprising: at least one transceiver; at least one processor; and at least one memory operably connected to the at least one processor and configured to store instructions that, when executed, cause the at least one processor to perform operations comprising: performing sensing on a plurality of beams, wherein each of the plurality of beams is sensed independently; performing, through at least one transceiver, the UL transmission through at least one beam sensed to be idle among the plurality of beams, wherein counter values for the each of the plurality of beams are set independently.

According to the present disclosure, for transmission in a specific beam direction or for multibeam transmission (subject to time-division multiplexing (TDM) and/or spatial-division multiplexing (SDM)), a listen-before-talk (LBT) type to be performed from among wide-beam LBT and narrow-beam LBT based on random backoff counter-based Cat-3 LBT or Cat-4 LBT may be determined, and an energy detection (ED) threshold may be differently configured according to a transmission type (e.g., unicast or broadcast), so that multiple beams may be efficiently transmitted and LBT for minimizing interference with other signals may be performed.

When independent per-beam LBT for multibeam transmission of a TDM and/or SDM format is performed in directions of a plurality of beams in a channel occupancy time (COT), independent per-beam LBT may be performed in a direction of each beam or independent per-beam LBT may be performed in a direction of a representative beam selected, so that multibeam transmission may be efficiently performed in one COT.

In addition, conditions under which a configured grant-physical uplink shared channel (CG-PUSCH) and a dynamic grant-physical uplink shared channel (DG-PUSCH) are capable of being continuously transmitted may be defined, so that continuous transmission of the CG-PUSCH and the DG-PUSCH may be efficiently performed.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DETAILED DESCRIPTION

Figure 1A:
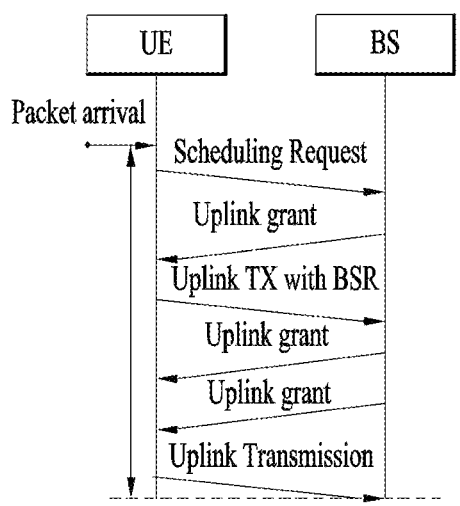
FIGS. 1A and 1B illustrate exemplary uplink (UL) transmission operations of a user equipment (UE)

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

While the following description is given in the context of a 3GPP communication system (e.g., NR) for clarity, the technical spirit of the present disclosure is not limited to the 3GPP communication system. For the background art, terms, and abbreviations used in the present disclosure, refer to the technical specifications published before the present disclosure (e.g., 38.211, 38.212, 38.213, 38.214, 38.300, 38.331, and so on).

5G communication involving a new radio access technology (NR) system will be described below.

Three key requirement areas of 5G are (1) enhanced mobile broadband (eMBB), (2) massive machine type communication (mMTC), and (3) ultra-reliable and low latency communications (URLLC).

Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is AR for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases in a 5G communication system including the NR system will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup may be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations.

Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

Figure 1B:
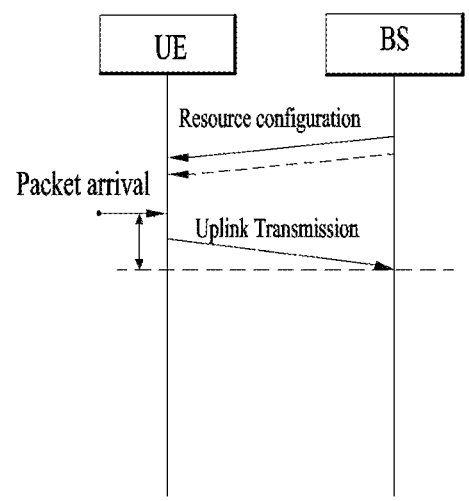

FIGS. 1A and 1B illustrate exemplary UL transmission operations of a UE. The UE may transmit an intended packet based on a DG (FIG. 1A) or based on a CG (FIG. 1B).

For UL, the BS may dynamically allocate resources for UL transmission to the UE by PDCCH(s) (including DCI format 0_0 or DCI format 0_1). Further, the BS may allocate UL resources for initial HARQ transmission to the UE based on a configured grant (CG) method (similarly to SPS). Although dynamic scheduling involves a PDCCH for a PUSCH transmission, a configured grant does not involve a PDCCH for a PUSCH transmission. However, UL resources for retransmission are explicitly allocated by PDCCH(s). As such, an operation of preconfiguring UL resources without a dynamic grant (DG) (e.g., a UL grant through scheduling DCI) by the BS is referred to as a "CG". Two types are defined for the CG.

Type 1: a UL grant with a predetermined periodicity is provided by higher-layer signaling (without L1 signaling).

Type 2: the periodicity of a UL grant is configured by higher-layer signaling, and activation/deactivation of the CG is signaled by a PDCCH, to provide the UL grant.

Resources for CGs may be shared between a plurality of UEs. A UL signal transmission based on a CG from each UE may be identified by time/frequency resources and an RS parameter (e.g., a different cyclic shift or the like). Therefore, when a UE fails in transmitting a UL signal due to signal collision, the BS may identify the UE and explicitly transmit a retransmission grant for a corresponding TB to the UE.

K repeated transmissions including an initial transmission are supported for the same TB by a CG. The same HARQ process ID is determined for K times repeated UL signals based on resources for the initial transmission. The redundancy versions (RVs) of a K times repeated TB have one of the patterns $\{0, 2, 3, 1\}$, $\{0, 3, 0, 3\}$, and $\{0, 0, 0, 0\}$.

The UE performs repeated transmissions until one of the following conditions is satisfied:

A UL grant for the same TB is successfully received;
The repetition number of the TB reaches K; and
the ending time of a period P is reached.

Similarly to licensed-assisted access (LAA) in the legacy 3GPP LTE system, use of an unlicensed band for cellular communication is also under consideration in a 3GPP NR system. Unlike LAA, a stand-along (SA) operation is aimed in an NR cell of an unlicensed band (hereinafter, referred to as NR unlicensed cell (UCell)). For example, PUCCH, PUSCH, and PRACH transmissions may be supported in the NR UCell.

On LAA UL, with the introduction of an asynchronous HARQ procedure, there is no additional channel such as a physical HARQ indicator channel (PHICH) for indicating HARQ-ACK information for a PUSCH to the UE. Therefore, accurate HARQ-ACK information may not be used to adjust a contention window (CW) size in a UL LBT procedure. In the UL LBT procedure, when a UL grant is received in the n-th subframe, the first subframe of the most recent UL transmission burst prior to the (n−3)-th subframe has been configured as a reference subframe, and the CW size has been adjusted based on a new data indicator (NDI) for a HARQ process ID corresponding to the reference subframe. That is, when the BS toggles NDIs per one or more transport blocks (TBs) or instructs that one or more TBs be retransmitted, a method has been introduced of increasing the CW size to the next largest CW size of a currently applied CW size in a set for pre-agreed CW sizes under the assumption that transmission of a PUSCH has failed in the reference subframe due to collision with other signals or initializing the CW size to a minimum value (e.g., CWmin) under the assumption that the PUSCH in the reference subframe has been successfully transmitted without any collision with other signals.

In an NR system to which various embodiments of the present disclosure are applicable, up to 400 MHz per component carrier (CC) may be allocated/supported. When a UE operating in such a wideband CC always operates with a radio frequency (RF) module turned on for the entire CC, battery consumption of the UE may increase.

Alternatively, considering various use cases (e.g., eMBB, URLLC, mMTC, and so on) operating within a single wideband CC, a different numerology (e.g., SCS) may be supported for each frequency band within the CC.

Alternatively, each UE may have a different maximum bandwidth capability.

In this regard, the BS may indicate to the UE to operate only in a partial bandwidth instead of the total bandwidth of the wideband CC. The partial bandwidth may be defined as a bandwidth part (BWP).

A BWP may be a subset of contiguous RBs on the frequency axis. One BWP may correspond to one numerology (e.g., SCS, CP length, slot/mini-slot duration, and so on).

Figure 2A:
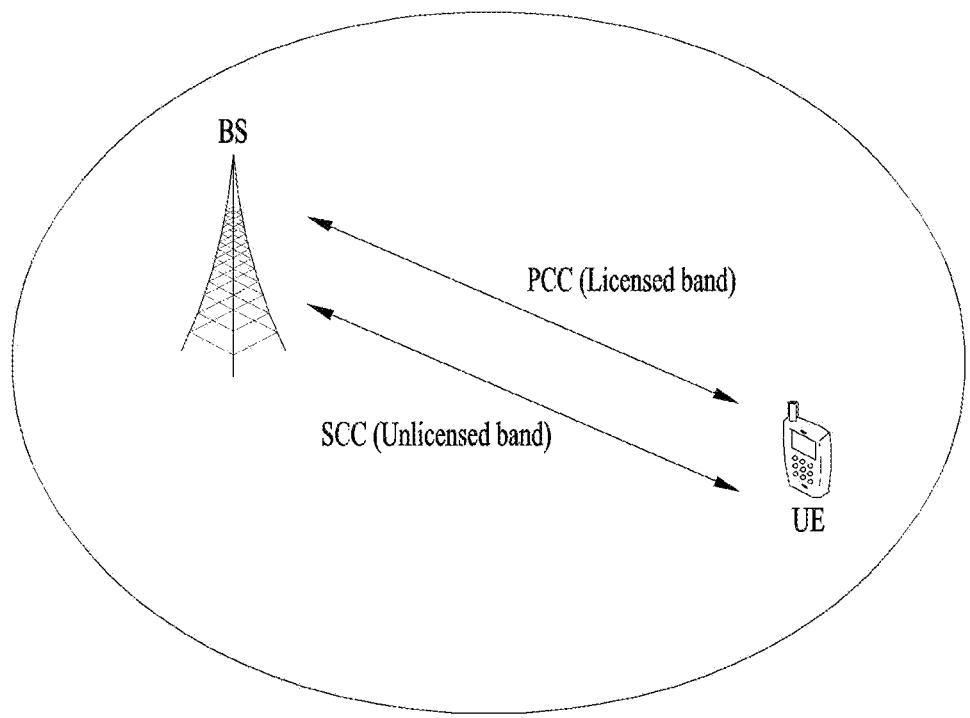
FIGS. 2A and 2B illustrate a wireless communication system supporting an unlicensed band.
Figure 2B:
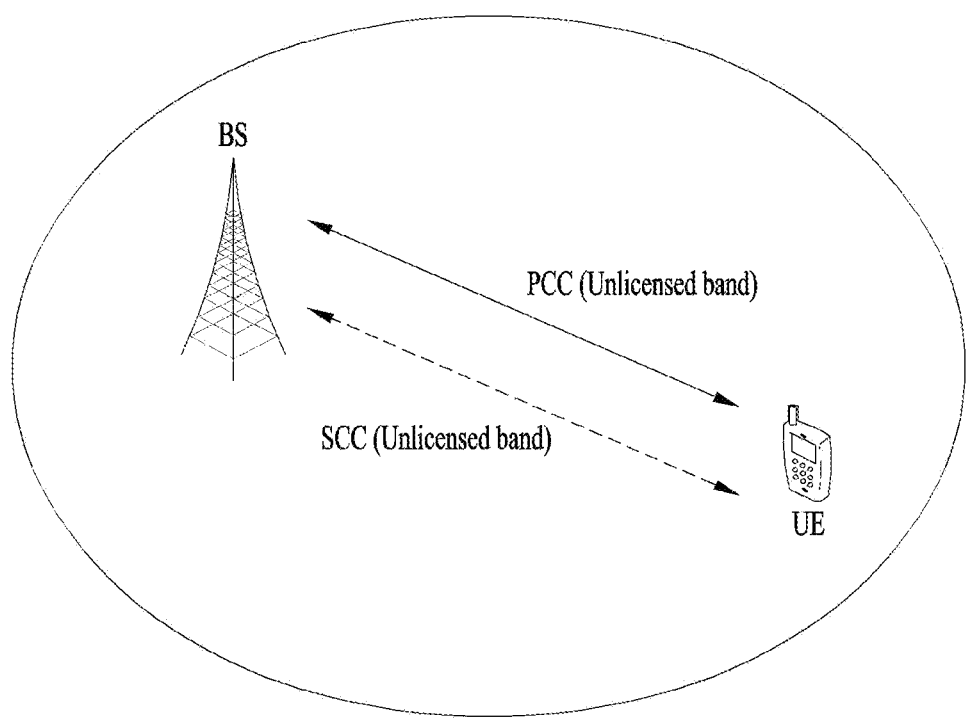

FIGS. 2A and 2B illustrate an exemplary wireless communication system supporting an unlicensed band applicable to the present disclosure.

In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

When a BS and a UE transmit and receive signals on carrier-aggregated LCC and UCC as illustrated in FIG. 2A, the LCC and the UCC may be configured as a primary CC (PCC) and a secondary CC (SCC), respectively. The BS and the UE may transmit and receive signals on one UCC or on a plurality of carrier-aggregated UCCs as illustrated in FIG. 2B. In other words, the BS and UE may transmit and receive signals only on UCC(s) without using any LCC. For an SA operation, PRACH, PUCCH, PUSCH, and SRS transmissions may be supported on a UCell.

Signal transmission and reception operations in an unlicensed band as described in the present disclosure may be applied to the afore-mentioned deployment scenarios (unless specified otherwise).

Unless otherwise noted, the definitions below are applicable to the following terminologies used in the present disclosure.

Channel: a carrier or a part of a carrier composed of a contiguous set of RBs in which a channel access procedure (CAP) is performed in a shared spectrum.

Channel access procedure (CAP): a procedure of assessing channel availability based on sensing before signal transmission in order to determine whether other communication node(s) are using a channel. A basic sensing unit is a sensing slot with a duration of Tsl=9 us. The BS or the UE senses the slot during a sensing slot duration. When power detected for at least 4 us within the sensing slot duration is less than an energy detection threshold Xthresh, the sensing slot duration Tsl is be considered to be idle. Otherwise, the sensing slot duration Tsl is considered to be busy. CAP may also be called listen before talk (LBT).

Channel occupancy: transmission(s) on channel(s) from the BS/UE after a CAP.

Channel occupancy time (COT): a total time during which the BS/UE and any BS/UE(s) sharing channel occupancy performs transmission(s) on a channel after a CAP. Regarding COT determination, if a transmission gap is less than or equal to 25 us, the gap duration may be counted in a COT.

The COT may be shared for transmission between the BS and corresponding UE(s).

Specifically, sharing a UE-initiated COT with the BS may mean an operation in which the UE assigns a part of occupied channels through random backoff counter-based LBT (e.g., Category 3 (Cat-3) LBT or Category 4 (Cat-4) LBT) to the BS and the BS performs DL transmission using a remaining COT of the UE, when it is confirmed that a channel is idle by success of LBT after performing LBT without random backoff counter (e.g., Category 1 (Cat-1) LBT or Category 2 (Cat-2) LBT) using a timing gap occurring before DL transmission start from a UL transmission end timing of the UE.

Meanwhile, sharing a gNB-initiated COT with the UE may mean an operation in which the BS assigns a part of occupied channels through random backoff counter-based LBT (e.g., Cat-3 LBT or Cat-4 LBT) to the UE and the UE performs UL transmission using a remaining COT of the BS, when it is confirmed that a channel is idle by success of LBT after performing LBT without random backoff counter (e.g., Cat-1 LBT or Cat-2 LBT) using a timing gap occurring before UL transmission start from a DL transmission end timing of the BS.

DL transmission burst: a set of transmissions without any gap greater than 16 us from the BS. Transmissions from the BS, which are separated by a gap exceeding 16 us are considered as separate DL transmission bursts. The BS may perform transmission(s) after a gap without sensing channel availability within a DL transmission burst.

UL transmission burst: a set of transmissions without any gap greater than 16 us from the UE. Transmissions from the UE, which are separated by a gap exceeding 16 us are considered as separate UL transmission bursts. The UE may perform transmission(s) after a gap without sensing channel availability within a DL transmission burst.

Discovery burst: a DL transmission burst including a set of signal(s) and/or channel(s) confined within a window and associated with a duty cycle. The discovery burst may include transmission(s) initiated by the BS, which includes a PSS, an SSS, and a cell-specific RS (CRS) and further includes a non-zero power CSI-RS. In the NR system, the discover burst includes may include transmission(s) initiated by the BS, which includes at least an SS/PBCH block and further includes a CORESET for a PDCCH scheduling a PDSCH carrying SIB1, the PDSCH carrying SIB1, and/or a non-zero power CSI-RS.

Figure 3:
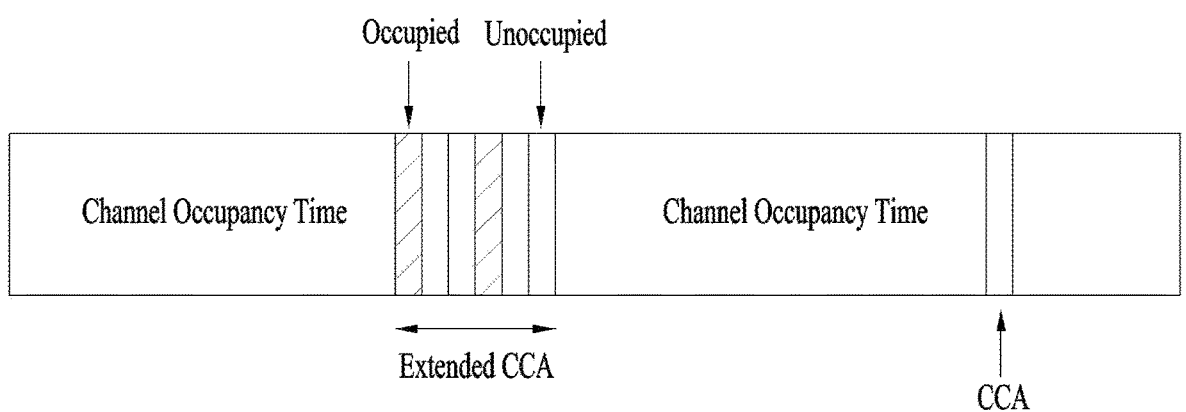
FIG. 3 illustrates an exemplary method of occupying resources in an unlicensed band.

FIG. 3 illustrates an exemplary method of occupying resources in an unlicensed band.

Referring to FIG. 3, a communication node (e.g., a BS or a UE) operating in an unlicensed band should determine whether other communication node(s) is using a channel, before signal transmission. For this purpose, the communication node may perform a CAP to access channel(s) on which transmission(s) is to be performed in the unlicensed band. The CAP may be performed based on sensing. For example, the communication node may determine whether other communication node(s) is transmitting a signal on the channel(s) by carrier sensing (CS) before signal transmission. Determining that other communication node(s) is not transmitting a signal is defined as confirmation of clear channel assessment (CCA). In the presence of a CCA threshold (e.g., Xthresh) which has been predefined or configured by higher-layer (e.g., RRC) signaling, the communication node may determine that the channel is busy, when detecting energy higher than the CCA threshold in the channel. Otherwise, the communication node may determine that the channel is idle. When determining that the channel is idle, the communication node may start to transmit a signal in the unlicensed band. CAP may be replaced with LBT.

Table 1 describes an exemplary CAP supported in NR-U.

TABLE 1

|    | Type | Explanation |
| --- | --- | --- |
| DL | Type 1 CAP | CAP with random backoff time duration spanned by the sensing slots that are sensed to be idle before a downlink transmission(s) is random |
|    | Type 2 CAP | CAP without random backoff |
|    | Type 2A, 2B, 2C | time duration spanned by sensing slots that are sensed to be idle before a downlink transmission(s) is deterministic |
| UL | Type 1 CAP | CAP with random backoff time duration spanned by the sensing slots that are sensed to be idle before a downlink transmission(s) is random |
|    | Type 2 CAP | CAP without random backoff |
|    | Type 2A, 2B, 2C | time duration spanned by sensing slots that are sensed to be idle before a downlink transmission(s) is deterministic |

In a wireless communication system supporting an unlicensed band, one cell (or carrier (e.g., CC)) or BWP configured for a UE may be a wideband having a larger bandwidth (BW) than in legacy LTE. However, a BW requiring CCA based on an independent LBT operation may be limited according to regulations. Let a subband (SB) in which LBT is individually performed be defined as an LBT-SB. Then, a plurality of LBT-SBs may be included in one wideband cell/BWP. A set of RBs included in an LBT-SB may be configured by higher-layer (e.g., RRC) signaling. Accordingly, one or more LBT-SBs may be included in one cell/BWP based on (i) the BW of the cell/BWP and (ii) RB set allocation information. A plurality of LBT-SBs may be included in the BWP of a cell (or carrier). An LBT-SB may be, for example, a 20-MHz band. The LBT-SB may include a plurality of contiguous (P)RBs in the frequency domain, and thus may be referred to as a (P)RB set.

A UE performs a Type 1 or Type 2 CAP for a UL signal transmission in an unlicensed band. In general, the UE may perform a CAP (e.g., Type 1 or Type 2) configured by a BS, for a UL signal transmission. For example, CAP type indication information may be included in a UL grant (e.g., DCI format 0_0 or DCI format 0_1) that schedules a PUSCH transmission.

In the Type 1 UL CAP, the length of a time period spanned by sensing slots sensed as idle before transmission(s) is random. The Type 1 UL CAP may be applied to the following transmissions.

PUSCH/SRS transmission(s) scheduled and/or configured by BS

PUCCH transmission(s) scheduled and/or configured by BS

Transmission(s) related to random access procedure (RAP)

Figure 4:
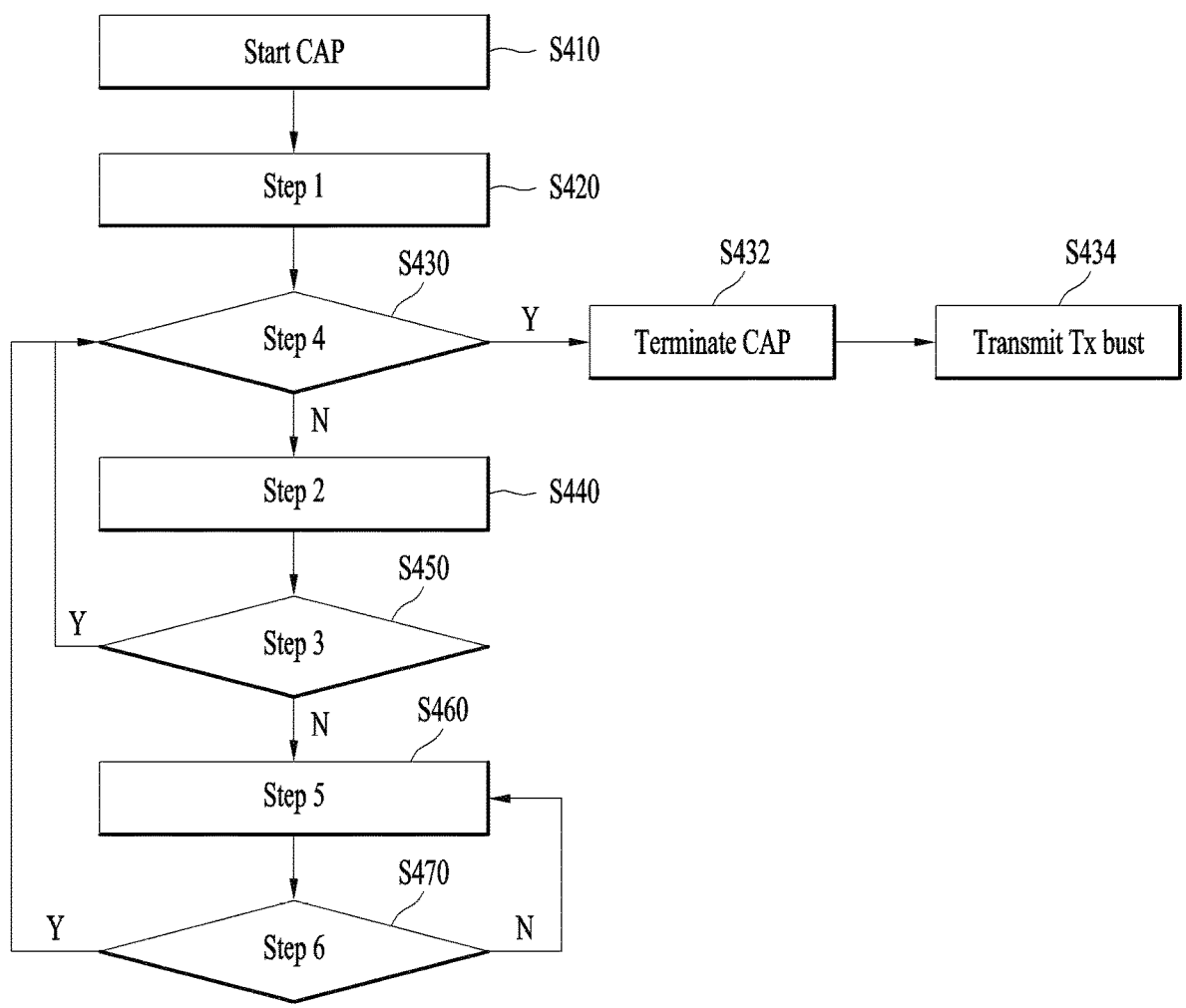
FIG. 4 illustrates an exemplary channel access procedure of a UE for UL signal transmission and/or DL signal transmission in an unlicensed band applicable to the present disclosure.

FIG. 4 illustrates Type 1 CAP among channel access procedures of a UE for UL/DL signal transmission in a U-band applicable to the present disclosure.

First, UL signal transmission in the U-band will be described with reference to FIG. 4.

The UE may sense whether a channel is idle for a sensing slot duration in a defer duration Td. After a counter N is decremented to 0, the UE may perform a transmission (S434). The counter N is adjusted by sensing the channel for additional slot duration(s) according to the following procedure.

Step 1) Set N=Ninit where Ninit is a random number uniformly distributed between 0 and CWp, and go to step 4 (S420).

Step 2) If N>0 and the UE chooses to decrement the counter, set N=N−1 (S440).

Step 3) Sense the channel for an additional slot duration, and if the additional slot duration is idle (Y), go to step 4. Else (N), go to step 5 (S450).

Step 4) If N=0 (Y) (S430), stop CAP (S432). Else (N), go to step 2.

Step 5) Sense the channel until a busy sensing slot is detected within the additional defer duration Td or all slots of the additional defer duration Td are sensed as idle (S460).

Step 6) If the channel is sensed as idle for all slot durations of the additional defer duration Td (Y), go to step 4. Else (N), go to step 5 (S470).

Table 2 illustrates that mp, a minimum CW, a maximum CW, a maximum channel occupancy time (MCOT), and an allowed CW size applied to a CAP vary according to channel access priority classes.

TABLE 2

| Channel Access Priority Class (p) | mp | CWmin, p | CWmax, p | Tulmcot, p | allowed CWp sizes |
|---|---|---|---|---|---|
| 1 | 2 | 3 | 7 | 2 ms | {3, 7} |
| 2 | 2 | 7 | 15 | 4 ms | {7, 15} |

TABLE 2-continued

| Channel Access Priority Class (p) | mp | CWmin, p | CWmax, p | Tulmcot, p | allowed CWp sizes |
|---|---|---|---|---|---|
| 3 | 3 | 15 | 1023 | 6 or 10 ms | {15, 31, 63, 127, 255, 511, 1023} |
| 4 | 7 | 15 | 1023 | 6 or 10 ms | {15, 31, 63, 127, 255, 511, 1023} |

The defer duration Td includes a duration Tf (16 us) immediately followed by mp consecutive slot durations where each slot duration Tsl is 9 us, and Tf includes a sensing slot duration Tsl at the start of the 16-us duration. $CWW_{min,p} \leq CW_p \leq CW_{max,p}$. CWp is set to CWmin,p, and may be updated before Step 1 based on an explicit/implicit reception response to a previous UL burst (e.g., PUSCH) (CW size update). For example, CWp may be initialized to CWmin,p based on an explicit/implicit reception response to the previous UL burst, may be increased to the next higher allowed value, or may be maintained to be an existing value.

In the Type 2 UL CAP, the length of a time period spanned by sensing slots sensed as idle before transmission(s) is deterministic. Type 2 UL CAPs are classified into Type 2A UL CAP, Type 2B UL CAP, and Type 2C UL CAP. In the Type 2A UL CAP, the UE may transmit a signal immediately after the channel is sensed as idle during at least a sensing duration Tshort_dl (=25 us). Tshort_dl includes a duration Tf (=16 us) and one immediately following sensing slot duration. In the Type 2A UL CAP, Tf includes a sensing slot at the start of the duration. In the Type 2B UL CAP, the UE may transmit a signal immediately after the channel is sensed as idle during a sensing slot duration Tf (=16 us). In the Type 2B UL CAP, Tf includes a sensing slot within the last 9 us of the duration. In the Type 2C UL CAP, the UE does not sense a channel before a transmission.

To allow the UE to transmit UL data in the unlicensed band, the BS should succeed in an LBT operation to transmit a UL grant in the unlicensed band, and the UE should also succeed in an LBT operation to transmit the UL data. That is, only when both of the BS and the UE succeed in their LBT operations, the UE may attempt the UL data transmission. Further, because a delay of at least 4 msec is involved between a UL grant and scheduled UL data in the LTE system, earlier access from another transmission node coexisting in the unlicensed band during the time period may defer the scheduled UL data transmission of the UE. In this context, a method of increasing the efficiency of UL data transmission in an unlicensed band is under discussion.

To support a UL transmission having a relatively high reliability and a relatively low time delay, NR also supports CG type 1 and CG type 2 in which the BS preconfigures time, frequency, and code resources for the UE by higher-layer signaling (e.g., RRC signaling) or both of higher-layer signaling and L1 signaling (e.g., DCI). Without receiving a UL grant from the BS, the UE may perform a UL transmission in resources configured with type 1 or type 2. In type 1, the periodicity of a CG, an offset from SFN=0, time/frequency resource allocation, a repetition number, a DMRS parameter, an MCS/TB size (TBS), a power control parameter, and so on are all configured only by higher-layer signaling such as RRC signaling, without L1 signaling. Type 2 is a scheme of configuring the periodicity of a CG and a power control parameter by higher-layer signaling such as RRC signaling and indicating information about the remaining resources (e.g., the offset of an initial transmission timing, time/frequency resource allocation, a DMRS parameter, and an MCS/TBS) by activation DCI as L1 signaling.

The biggest difference between autonomous uplink (AUL) of LTE LAA and a CG of NR is a HARQ-ACK feedback transmission method for a PUSCH that the UE has transmitted without receiving a UL grant and the presence or absence of UCI transmitted along with the PUSCH. While a HARQ process is determined by an equation of a symbol index, a symbol periodicity, and the number of HARQ processes in the CG of NR, explicit HARQ-ACK feedback information is transmitted in AUL downlink feedback information (AUL-DFI) in LTE LAA. Further, in LTE LAA, UCI including information such as a HARQ ID, an NDI, and an RV is also transmitted in AUL UCI whenever AUL PUSCH transmission is performed. In the case of the CG of NR, the BS identifies the UE by time/frequency resources and DMRS resources used for PUSCH transmission, whereas in the case of LTE LAA, the BS identifies the UE by a UE ID explicitly included in the AUL UCI transmitted together with the PUSCH as well as the DMRS resources.

Now, DL signal transmission in the U-band will be described with reference to FIG. 4.

The BS may perform one of the following U-band access procedures (e.g., channel access procedures (CAPs)) to transmit a DL signal in the U-band.

(1) Type 1 DL CAP Method

In a Type 1 DL CAP, the length of a time duration spanned by sensing slots that are sensed to be idle before transmission(s) is random. The Type 1 DL CAP may be applied to the following transmissions:

- (i) transmission(s) initiated by the BS, including (i) a unicast PDSCH with user plane data, or (ii) a unicast PDSCH with user plane data and a unicast PDCCH scheduling the user plane data; or
- transmission(s) initiated by the BS, including (i) only a discovery burst, or (ii) a discovery burst multiplexed with non-unicast information.

Referring to FIG. 4, the BS may first sense whether a channel is idle for a sensing slot duration of a defer duration Td. Next, if a counter N is decremented to 0, transmission may be performed (S434). The counter N is adjusted by sensing the channel for additional slot duration(s) according to the following procedures.

Step 1) Set N=Ninit where Ninit is a random number uniformly distributed between 0 and CWp, and go to step 4 (S420).

Step 2) If N>0 and the B S chooses to decrement the counter, set N=N−1 (S440).

Step 3) Sense the channel for an additional slot duration, and if the additional slot duration is idle (Y), go to step 4. Else (N), go to step 5 (S450).

Step 4) If N=0 (Y), stop a CAP (S432). Else (N), go to step 2 (S430).

Step 5) Sense the channel until a busy sensing slot is detected within the additional defer duration Td or all slots of the additional defer duration Td are sensed to be idle (S460).

Step 6) If the channel is sensed to be idle for all slot durations of the additional defer duration Td (Y), go to step 4. Else (N), go to step 5 (S470).

Table 3 illustrates that mp, a minimum CW, a maximum CW, an MCOT, and an allowed CW size, which are applied to a CAP, vary according to channel access priority classes.

TABLE 3

| Channel Access Priority Class (p) | mp | CWmin, p | CWmax, p | Tmcot, p | allowed CWp sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

The defer duration Td includes a duration Tf (16 μs) immediately followed by mp consecutive sensing slot durations where each sensing slot duration Tsl is 9 μs, and Tf includes the sensing slot duration Tsl at the start of the 16-μs duration.

CWmin,p<=CWp<=CWmax,p. CWp is set to CWmin,p, and may be updated (CW size update) before Step 1 based on HARQ-ACK feedback (e.g., ratio of ACK signals or NACK signals) for a previous DL burst (e.g., PDSCH). For example, CWp may be initialized to CWmin,p based on HARQ-ACK feedback for the previous DL burst, may be increased to the next highest allowed value, or may be maintained at an existing value.

(2) Type 2 DL CAP Method

In a Type 2 DL CAP, the length of a time duration spanned by sensing slots sensed to be idle before transmission(s) is deterministic. Type 2 DL CAPs are classified into Type 2A DL CAP, Type 2B DL CAP, and Type 2C DL CAP.

The Type 2A DL CAP may be applied to the following transmissions. In the Type 2A DL CAP, the BS may transmit a signal immediately after a channel is sensed to be idle during at least a sensing duration Tshort_dl=25 μs. Tshort_dl includes a duration Tf (=16 μs) and one immediately following sensing slot duration. Tf includes the sensing slot at the start of the duration.

- Transmission(s) initiated by the BS, including (i) only a discovery burst, or (ii) a discovery burst multiplexed with non-unicast information, or
- Transmission(s) of the BS after a gap of 25 μs from transmission(s) by the UE within shared channel occupancy.

The Type 2B DL CAP is applicable to transmission(s) performed by the BS after a gap of 16 μs from transmission(s) by the UE within shared channel occupancy. In the Type 2B DL CAP, the BS may transmit a signal immediately after a channel is sensed to be idle during Tf=16 μs. Tf includes a sensing slot within the last 9 μs of the duration. The Type 2C DL CAP is applicable to transmission(s) performed by the BS after a maximum of a gap of 16 μs from transmission(s) by the UE within shared channel occupancy. In the Type 2C DL CAP, the BS does not sense a channel before performing transmission.

In a wireless communication system supporting a U-band, one cell (or carrier (e.g., CC)) or BWP configured for the UE may consist of a wideband having a larger BW than in legacy LTE. However, a BW requiring CCA based on an independent LBT operation may be limited according to regulations. If a subband (SB) in which LBT is individually performed is defined as an LBT-SB, a plurality of LBT-SBs may be included in one wideband cell/BWP. A set of RBs constituting an LBT-SB may be configured by higher-layer (e.g., RRC) signaling. Accordingly, one or more LBT-SBs may be included in one cell/BWP based on (i) the BW of the cell/BWP and (ii) RB set allocation information.

Figure 5:
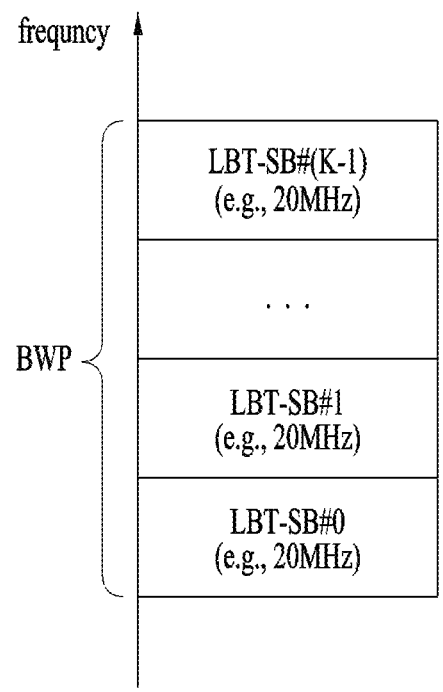
FIG. 5 is a diagram illustrating a plurality of listen-before-talk subbands (LBT-SBs) applicable to the present disclosure.

FIG. 5 illustrates that a plurality of LBT-SBs is included in a U-band.

Referring to FIG. 5, a plurality of LBT-SBs may be included in the BWP of a cell (or carrier). An LBT-SB may be, for example, a 20-MHz band. The LBT-SB may include a plurality of contiguous (P)RBs in the frequency domain and thus may be referred to as a (P)RB set. Although not illustrated, a guard band (GB) may be included between the LBT-SBs. Therefore, the BWP may be configured in the form of {LBT-SB #0 (RB set #0)+GB #0+LBT-SB #1 (RB set #1+GB #1)+ . . . +LBT-SB #(K−1) (RB set (#K−1))}. For convenience, LBT-SB/RB indexes may be configured/defined to be increased as a frequency band becomes higher starting from a low frequency band.

In the NR system, a massive multiple input multiple output (MIMO) environment in which the number of transmission/reception (Tx/Rx) antennas is significantly increased may be under consideration. That is, as the massive MIMO environment is considered, the number of Tx/Rx antennas may be increased to a few tens or hundreds. The NR system supports communication in an above 6 GHz band, that is, a millimeter frequency band. However, the millimeter frequency band is characterized by the frequency property that a signal is very rapidly attenuated according to a distance due to the use of too high a frequency band. Therefore, in an NR system operating at or above 6 GHz, beamforming (BF) is considered, in which a signal is transmitted with concentrated energy in a specific direction, not omnidirectionally, to compensate for rapid propagation attenuation. Accordingly, there is a need for hybrid BF with analog BF and digital BF in combination according to a position to which a BF weight vector/precoding vector is applied, for the purpose of increased performance, flexible resource allocation, and easiness of frequency-wise beam control in the massive MIMO environment.

Figure 6:
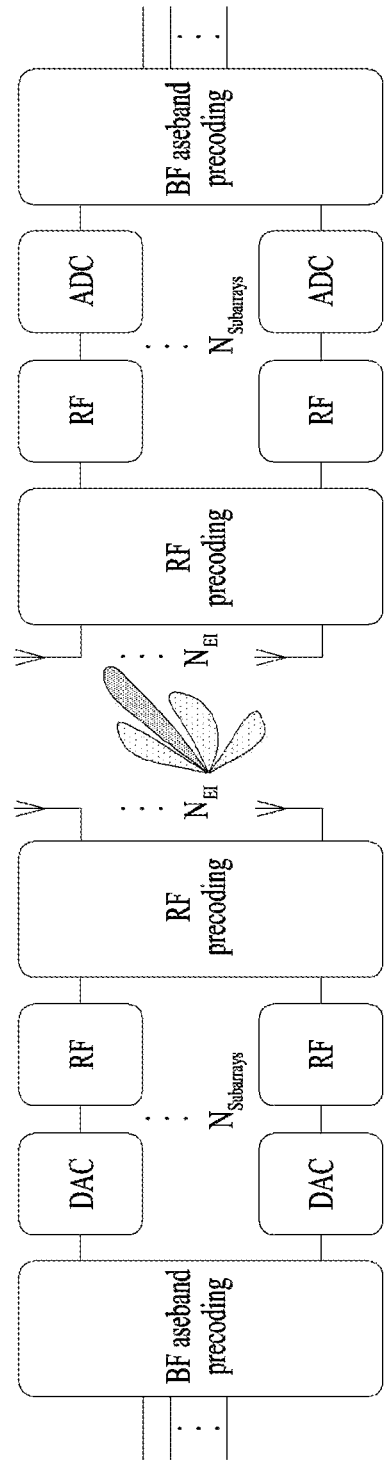
FIG. 6 is a diagram illustrating analog beamforming in the NR system.

FIG. 6 is a block diagram illustrating an exemplary transmitter and receiver for hybrid BF.

To form a narrow beam in the millimeter frequency band, a BF method is mainly considered, in which a BS or a UE transmits the same signal through multiple antennas by applying appropriate phase differences to the antennas and thus increasing energy only in a specific direction. Such BF methods include digital BF for generating a phase difference for digital baseband signals, analog BF for generating phase differences by using time delays (i.e., cyclic shifts) for modulated analog signals, and hybrid BF with digital BF and analog beamforming in combination. Use of a radio frequency (RF) unit (or transceiver unit (TXRU)) for antenna element to control transmission power and phase control on antenna element basis enables independent BF for each frequency resource. However, installing TXRUs in all of about 100 antenna elements is less feasible in terms of cost. That is, a large number of antennas are required to compensate for rapid propagation attenuation in the millimeter frequency, and digital BF needs as many RF components (e.g., digital-to-analog converters (DACs), mixers, power amplifiers, and linear amplifiers) as the number of antennas. As a consequence, implementation of digital BF in the millimeter frequency band increases the prices of communication devices. Therefore, analog BF or hybrid BF is considered, when a large number of antennas are needed as is the case with the millimeter frequency band. In analog BF, a plurality of antenna elements are mapped to a single TXRU and a beam direction is controlled by an analog phase shifter. Because only one beam direction is generated across a total band in analog BF, frequency-selective BF may not be achieved with analog BF. Hybrid BF is an intermediate form of digital BF and analog BF, using B RF units fewer than Q antenna elements. In hybrid BF, the number of beam directions available for simultaneous transmission is limited to B or less, which depends on how B RF units and Q antenna elements are connected.

Beam Management (BM)

The BM refers to a series of processes for acquiring and maintaining a set of BS beams (transmission and reception point (TRP) beams) and/or a set of UE beams available for DL and UL transmission/reception. The BM may include the following processes and terminology.

Beam measurement: an operation by which the BS or UE measures the characteristics of a received beamformed signal Beam determination: an operation by which the BS or UE selects its Tx/Rx beams Beam sweeping: an operation of covering a spatial domain by using Tx and/or Rx beams for a prescribed time interval according to a predetermined method Beam report: an operation by which the UE reports information about a signal beamformed based on the beam measurement.

The BM procedure may be divided into (1) a DL BM procedure using an SSB or CSI-RS and (2) a UL BM procedure using an SRS. Further, each BM procedure may include Tx beam sweeping for determining a Tx beam, and Rx beam sweeping for determining an Rx beam.

The DL BM procedure may include (1) transmission of beamformed DL RSs (e.g., CSI-RS or SSB) from the BS and (2) beam reporting from the UE.

A beam report may include preferred DL RS ID(s) and reference signal received power(s) (RSRP(s)) corresponding to the preferred DL RS ID(s). ADL RS ID may be an SSB resource indicator (SSBRI) or a CSI-RS resource indicator (CRI).

2. DL BM-Related Beam Indication

The UE may receive at least a list of up to M candidate transmission configuration indication (TCI) states for QCL indication by RRC signaling. M depends on a UE capability and may be 64.

Each TCI state may be configured with one RS set. Table 4 describes an example of a TCI-State IE. The TC-State IE is related to a QCL type corresponding to one or two DL RSs.

TABLE 4

```
--ASN1START
--TAG-TCI-STATE-START
TCI-State ::= SEQUENCE {
tci-StateId,
qcl-Type1 QCL-Info,
qcl-Type2 QCL-Info OPTIONAL,  -- Need R
...
}
QCL-Info ::= SEQUENCE {
```

TABLE 4-continued

```
cell ServCellIndex OPTIONAL, -- Need R
bwp-Id BWP-Id OPTIONAL,  -- Cond CSI-RS-Indicated
referenceSignal CHOICE {
csi-rs NZP-CSI-RS-ResourceId,
ssb SSB-Index
},
qcl-Type ENUMERATED {typeA, typeB, typeC, typeD},
...
}
--TAG-TCI-STATE-STOP
--ASN1STOP
```

In Table 4, 'bwp-Id' identifies a DL BWP in which an RS is located, 'cell' indicates a carrier in which the RS is located, and 'referencesignal' indicates reference antenna port(s) serving as a QCL source for target antenna port(s) or an RS including the reference antenna port(s). The target antenna port(s) may be for a CSI-RS, PDCCH DMRS, or PDSCH DMRS.

3. Quasi-Co Location (QCL)

The UE may receive a list of up to M TCI-State configurations to decode a PDSCH according to a detected PDCCH carrying DCI intended for a given cell. M depends on a UE capability.

As described in Table 4, each TCI-State includes a parameter for establishing the QCL relationship between one or more DL RSs and a PDSCH DM-RS port. The QCL relationship is established with an RRC parameter qcl-Type1 for a first DL RS and an RRC parameter qcl-Type2 for a second DL RS (if configured).

The QCL type of each DL RS is given by a parameter 'gel-Type' included in QCL-Info and may have one of the following values.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, if a target antenna port is for a specific NZP CSI-RS, the NZP CSI-RS antenna port may be indicated/configured as QCLed with a specific TRS from the perspective of QCL-Type A and with a specific SSB from the perspective of QCL-Type D. Upon receipt of this indication/configuration, the UE may receive the NZP CSI-RS using a Doppler value and a delay value which are measured in a QCL-TypeA TRS, and apply an Rx beam used to receive a QCL-Type D SSB for reception of the NZP CSI-RS UL BM Procedure In UL BM, beam reciprocity (or beam correspondence) between Tx and Rx beams may or may not be established according to the implementation of the UE. If the Tx-Rx beam reciprocity is established at both the BS and UE, a UL beam pair may be obtained from a DL beam pair. However, if the Tx-Rx beam reciprocity is established at neither the BS nor UE, a process for determining a UL beam may be required separately from determination of a DL beam pair.

In addition, even when both the BS and UE maintain the beam correspondence, the BS may apply the UL BM procedure to determine a DL Tx beam without requesting the UE to report its preferred beam.

The UL BM may be performed based on beamformed UL SRS transmission. Whether the UL BM is performed on a set of SRS resources may be determined by a usage parameter (RRC parameter). If the usage is determined as BM, only one SRS resource may be transmitted for each of a plurality of SRS resource sets at a given time instant.

The UE may be configured with one or more SRS resource sets (through RRC signaling), where the one or more SRS resource sets are configured by SRS-ResourceSet (RRC parameter). For each SRS resource set, the UE may be configured with K>1 SRS resources, where K is a natural number, and the maximum value of K is indicated by SRS capability.

The UL BM procedure may also be divided into Tx beam sweeping at the UE and Rx beam sweeping at the BS similarly to DL BM.

In proposed methods to be described later, a beam may mean an area for performing a specific operation (e.g., LBT or transmission) by concentrating power in a specific direction and/or in a specific space. In other words, the UE or the BS may perform an operation such as LBT (Listen Before Talk) or transmission by targeting a specific area (i.e., a beam) corresponding to a specific space and/or a specific direction. Thus, each beam may correspond to each space and/or each direction. In addition, the UE or the BS may use a spatial domain filter corresponding to each space and/or each direction in order to use each beam. That is, one spatial domain filter may correspond to one or more beams. The UE or the BS may perform an operation such as LBT or transmission using the spatial domain filter corresponding to a beam (or space and/or direction) to be used.

For example, the UE or the BS may perform LBT using a spatial domain filter corresponding to an LBT beam in a space and/or a direction for the corresponding LBT beam or perform DL/UL transmission using a spatial domain filter corresponding to a Tx beam in a space and/or a direction for the corresponding Tx beam.

Hereinafter, the present disclosure proposes an efficient LBT method based on a multichannel access procedure applied to independent per-beam LBT for transmission in a plurality of beam directions through extension to the spatial domain. The present disclosure also proposes a method of differently configuring an energy detection (ED) threshold depending on whether the type of DL/UL transmission is broadcast transmission or unicast transmission, and a method of sharing a COT for each transmission type.

A typical CAP performed for transmission in a U-band is LBT. LBT is a mechanism that prevents collision between transmissions by allowing transmission of a corresponding signal when a noise level is less than a certain level as a result of comparing a surrounding interference level measured by the BS and/or the UE that is to transmit signals with a specific threshold such as an ED threshold.

Figure 7A:
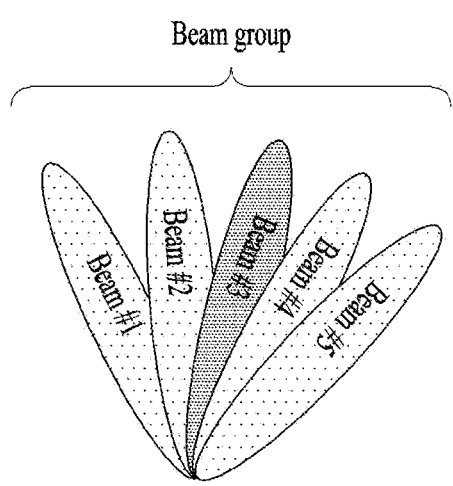
FIGS. 7A and 7B are diagrams illustrating beam-based LBT and group-based LBT according to an embodiment of the present disclosure.
Figure 7B:
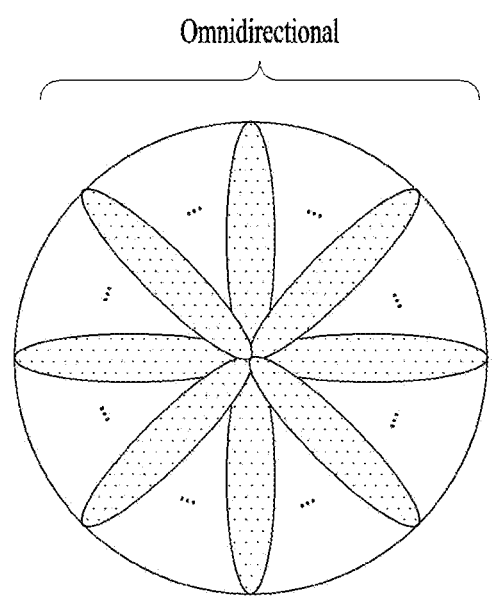

FIGS. 7A and 7B illustrate exemplary D-LBT and exemplary O-LBT.

FIG. 7A illustrates D-LBT including specific beam direction LBT and/or beam group unit LBT, and FIG. 7B illustrates O-LBT.

In a legacy NR-U system (e.g., Rel-16 NR-U), a DL/UL signal/channel has been transmitted if it is determined that a channel is idle by performing a CAP (i.e., LBT) as described with reference to FIGS. 7A and 7B. On the other hand, in the legacy NR-U system, an LBT band has been aligned with LBT bands of other RATs for coexistence with other RATs (e.g., Wi-Fi), and the CAP (i.e., LBT) has been performed omnidirectionally. In other words, non-directional LBT has been performed in the legacy NR-U system.

However, Rel-17 NR-U for transmitting the DL/UL signal/channel in a higher band (e.g., a band of 52.6 GHz or higher) than a U-band of 7 GHz used in the legacy NR-U system may utilize directional LBT (D-LBT) which transmits the signal/channel by concentrating energy in a specific beam direction in order to overcome path loss larger than in the band of 7 GHz used in the legacy system. That is, in Rel-17 NR-U, the DL/UL signal/channel may be transmitted over wider coverage by reducing path loss through D-LBT, and efficiency may be improved even in coexistence with other RATs (e.g., WiGig).

Referring to FIG. 7A, when a beam group consists of beams #1 to #5, performing LBT based on beams #1 to #5 may be referred to as beam group unit LBT. In addition, performing LBT through any one (e.g., beam #3) of beams #1 to #5 may be referred to as specific beam direction LBT. In this case, beams #1 to #5 may be continuous (or adjacent) beams but may also be discontinuous (or non-adjacent) beams. Further, the number of beams included in the beam group is not necessarily plural, and a single beam may form one beam group.

Meanwhile, although per-beam LBT may be performed, per-beam-group LBT may also be performed. For example, if per-beam LBT is performed, beams #1 to #5 may cover a plurality of Tx beams multiplexed through time-division multiplexing (TDM) and/or spatial-division multiplexing (SDM), respectively. For example, beam #1 may cover Tx beam #1 among the plural Tx beams multiplexed through TDM and/or SDM, beam #2 may cover Tx beams #2 among the plural Tx beams, beam #3 may cover Tx beam #3 among the plural of Tx beams, beam #4 may cover Tx beam #4 among the plural Tx beams, and beam #5 may cover Tx beam #5 among the plural Tx beams. Here, covering may mean that an area of a beam for performing LBT includes or is at least the same as an area on which a Tx beam corresponding to the corresponding beam has a valid effect (or interference).

In other words, covering may mean performing energy measurement through a sensing beam for performing LBT including an area affected by the interference of a Tx beam. In addition, whether a channel is idle/busy may be determined by comparing energy measured through the sensing beam with an ED threshold.

As another example, performing per-beam-group LBT may mean that LBT is simultaneously performed in a beam group unit for a plurality of Tx beams, multiplexed through TDM and/or SDM, corresponding to beams included in a beam group. In other words, one beam for a beam group (hereinafter, a group LBT beam) may be formed and LBT may be simultaneously performed for all of a plurality of Tx beams using the group LBT beam.

Accordingly, the group LBT beam may cover all Tx beams (e.g., Tx beam #1 to Tx beam #5) corresponding to the beam group. For example, an area of the group LBT beam may include or be at least the same as all of areas on which each of the Tx beams (e.g., Tx beam #1 to Tx beam #5) has a valid effect (or interference).

FIG. 7B illustrates O-LBT. When omnidirectional beams constitute one beam group and perform LBT in units of the corresponding beam group, this may be interpreted as performing omnidirectional LBT (O-LBT). In other words, if beams of all directions, i.e., omnidirectional beams which are a set of beams covering a specific sector in a cell, are included in one beam group, this may mean O-LBT.

In other words, in the case of a high frequency band, coverage may be limited due to significant path loss. In order to overcome such a coverage problem, a multi-antenna technique may be used. For example, narrow-beam transmission in which a signal is transmitted by concentrating energy in a specific direction, rather than omnidirectional transmission, may be performed.

In a high-frequency U-band, along with a CAP such as LBT described above, beam-based transmission combined therewith needs to be considered. For example, in order to perform D-LBT in a specific direction, D-LBT may be performed only in the corresponding direction or LBT may be performed in units of a beam group including a beam of the corresponding direction. Then, if a channel is determined to be idle, transmission may be performed. Here, the beam group may include a single beam or a plurality of beams. If the beam group includes omnidirectional beams, D-LBT may be extended to O-LBT.

For transmission in a plurality of beam directions in the high-frequency U-band, D-LBT or O-LBT based on random backoff counter-based LBT (e.g., Cat-3 LBT or Cat-4 LBT) that covers all of a plurality of beam directions in which transmission is to be performed may need to be performed. In this case, when performing per-beam independent LBT including a plurality of narrow beams, LBT may be sequentially performed in each beam direction. However, in the above-described method, since a time required to perform LBT in all beam directions is increased, a relatively long time may be required to access a channel for starting transmission as compared with O-LBT.

Therefore, a representative beam direction may be determined among a plurality of narrow-beam directions in which LBT is to be performed by extending a multichannel access procedure of Rel-16 NR-U to the spatial domain. Then, random backoff counter-based LBT (e.g., Cat-3 LBT or Cat-4 LBT) may be performed only in the determined representative beam direction, and LBT (e.g., Cat-2 LBT) other than random backoff counter-based LBT may be performed in the remaining beam directions immediately before transmission. Transmission may be started when LBT is successful, so that a delay time required until start of transmission may be reduced.

Meanwhile, an ED threshold, which is a criterion for determining whether a channel is idle or busy when LBT is performed, may be differently configured depending on whether transmission is broadcast transmission after wide-beam LBT (e.g., beam group LBT or O-LBT) or unicast transmission in a specific beam direction after narrow-beam LBT (D-LBT). For example, an ED threshold of beam-swept and broadcast transmission, such as transmission of a synchronization signal block (SSB) or a beam management sounding reference signal (SRS), may be set to be a high ED threshold relative to an ED threshold of unicast transmission performed only in a specific direction after narrow LBT, such as transmission of a physical downlink shared channel (PDSCH) or a physical uplink shared channel (PUSCH). From the perspective of COT sharing, it may be desirable not to allow COT sharing for broadcast transmission after wide-beam LBT and it may be desirable to allow COT sharing only for unicast transmission after narrow-beam LBT.

In addition, when it is desired to perform downlink (DL)/uplink (UL) transmission in a specific beam direction, an LBT method to be used between wide-beam LBT and narrow-beam LBT may be determined by the capability of the UE or according to whether COT sharing is used (allowed).

Before a description of proposed methods, NR-based channel access schemes for an unlicensed band used in the present disclosure are classified as follows.

Category 1 (Cat-1): the next transmission immediately follows the previous transmission after a switching gap within a COT, and the switching gap is shorter than 16 us, including even a transceiver turn-around time. Cat-1 LBT may correspond to the above-described Type 2C CAP.

Category 2 (Cat-2): an LBT method without backoff. Once a channel is confirmed to be idle during a specific time period shortly before transmission, the transmission may be performed immediately. Cat-2 LBT may be subdivided according to the length of a minimum sensing duration required for channel sensing immediately before a transmission. For example, Cat-2 LBT with a minimum sensing duration of 25 us may correspond to the above-described Type 2A CAP, and Cat-2 LBT with a minimum sensing duration of 16 us may correspond to the above-described Type 2B CAP. The minimum sensing durations are merely exemplary, and a minimum sensing duration less than 25 us or 16 us (e.g., a minimum sensing duration of 9 us) may also be available.

Category 3 (Cat-3): an LBT method with fixed contention window size (CWS)i-based backoff. A transmitting entity selects a random number N in a range of 0 to a (fixed) maximum CWS value and decrements a counter value each time it determines that a channel is idle. When the counter value reaches 0, the transmitting entity is allowed to perform a transmission.

Category 4 (Cat-4): an LBT method with variable CWS-based backoff. A transmitting entity selects a random number N in a range of 0 to a (variable) maximum CWS value and decrements a counter value, each time it determines that a channel is idle. When the counter value reaches 0, the transmitting entity is allowed to perform a transmission. If the transmitting entity receives a feedback indicating reception failure of the transmission, the transmitting entity increases the maximum CWS value by one level, selects a random number again within the increased CWS value, and performs an LBT procedure. Cat-4 LBT may correspond to the above-described Type 1 CAP.

As described above, in the high-frequency U-band of 52 GHz or higher, the BS or the UE may perform specific beam direction LBT or beam group LBT (D-LBT), in addition to O-LBT, as the channel access procedure, so that a DL or UL signal/channel may be transmitted.

Unlike a COT obtained by performing LBT in all directions, in a COT obtained by performing LBT in a specific direction, only for DL transmission and UL transmission having a correlation (e.g., QCL relation) with a beam direction in which LBT has been performed, transmission after Cat-2 LBT is desirably allowed and, for the other signals/channels, transmission after random backoff counter-based LBT (e.g., Cat-3 LBT or Cat-4 LBT) is desirably allowed. However, depending on a gap length between DL transmission and UL transmission, transmission after Cat-1 LBT, instead of transmission after Cat-2 LBT, may also be allowed.

LBT (e.g., Cat-2 LBT or Cat-1 LBT), which is not based on a random backoff counter, to be performed by the BS or the UE sharing a COT in the COT, may be performed in all directions or in a beam direction having a QCL relation with a beam direction that has been used to obtain the COT. In addition, upon receiving a DL signal/channel of a specific beam direction or beam group direction, the UE may be configured to monitor only a search space in the QCL relation with the specific beam direction or beam group direction in the corresponding COT.

Figure 8:
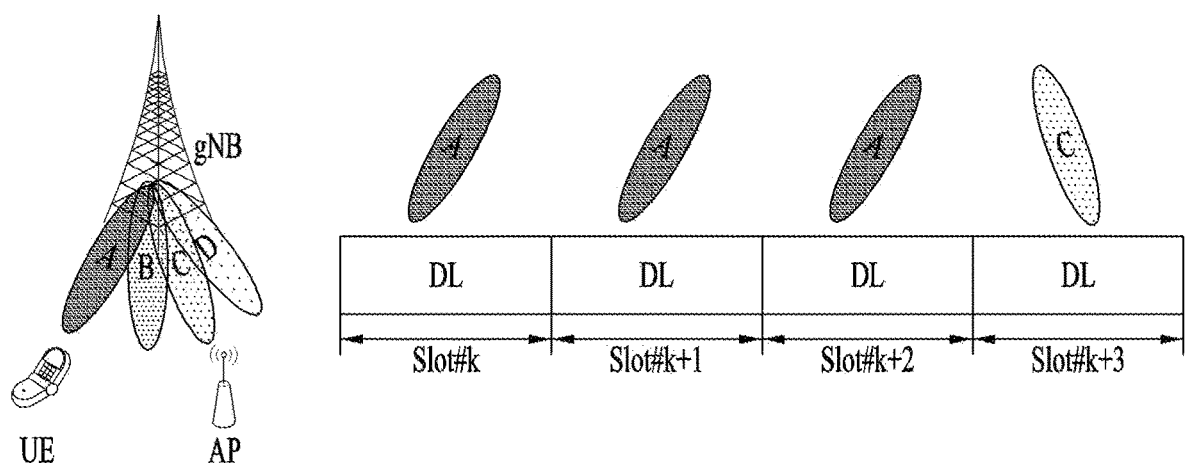
FIG. 8 is a diagram illustrating a problem occurring while beam-based LBT is performed according to an embodiment of the present disclosure.

It may be desirable for the following reasons to configure all DL signals/channels (or all UL signals/channels) included in one Tx burst as signals/channels having a spatial (partial) QCL relation. For example, in transmitting a Tx burst consisting of a total of 4 slots after the BS succeeds in LBT as illustrated in FIG. 8, the BS may transmit a signal in 3 slots in a beam direction of A and then transmit a signal in the fourth slot in a beam direction of C.

However, while the BS transmits a signal in the beam direction of A, a Wi-Fi AP coexisting in a corresponding U-band may fail to detect the signal transmitted in the beam direction of A and determine that a channel is idle. After succeeding in LBT, the Wi-Fi AP may start to transmit and receive a signal. In this case, if the BS transmits a signal in the beam direction of C starting from slot #k+3, the signal may act as interference with a corresponding Wi-Fi signal. Thus, when the BS that has performed transmission in the direction of A performs transmission by switching a beam direction without additional LBT, the BS may cause interference with another coexisting wireless node. Therefore, it may be desirable not to switch a Tx beam direction of a Tx burst that is transmitted after the BS succeeds in LBT.

In the NR system, a method of signalling beam information to be used by the UE during UL transmission and reception by associating a DL signal and a UL signal is under consideration. For example, if there is a beam direction generated by the UE on a channel state information reference signal (CSI-RS) resource by associating the CSI-RS resource and a sounding reference signal (SRS) resource, when the UE transmits an SRS on the SRS resource linked with the CSI-RS resource (or when the UE transmits a PUSCH scheduled through a UL grant through which the SRS resource linked with the CSI-RS resource is signalled), the UE may transmit the UL signal using a Tx beam corresponding to a CSI-RS Rx beam. In this case, the relationship between a specific Rx beam and a specific Tx beam may be configured by the UE in implementation when there is beam correspondence capability of the UE. Alternatively, the relationship between the specific Rx beam and the specific Tx beam may be configured by training of the BS and the UE when there is no beam correspondence capability of the UE.

Therefore, when an association relationship between the DL signal and the UL signal is defined, COT sharing may be allowed between a DL Tx burst consisting of DL signals/channels in a spatial (partial) QCL relation with the DL signal and a UL Tx burst consisting of UL signals/channels in a spatial (partial) QCL relation with the UL signal associated with the DL signal.

Here, the UL signals/channels may include at least one or more of the following signals/channels:
   an SRS, a demodulation reference signal (DMRS) for a PUCCH, a DMRS for a PUSCH, a PUCCH, a PUSCH, or a PRACH Here, the DL signals/channels may include at least one or more of the following signals/channels:
   a PSS, an SSS, a DMRS for a PBCH, a PBCH, a tracking reference signal (TRS), a CSI-RS for tracking, a CSI-RS for CSI acquisition, a CSI-RS for radio resource management (RRM) measurement, a CSI-RS for BM, a DMRS for a PDCCH, a DMRS for a PDSCH, a PDCCH (or a control resource set (CORESET) in which the PDCCH may be transmitted), a PDSCH, or a signal introduced for the purpose of tracking, (fine) time/frequency synchronization, coexistence, power saving, or frequency reuse factor=1, arranged in front of a Tx burst, as a modified signal of the above-listed signals or related signals or as a newly introduced signal Meanwhile, each proposed method to be described later may be combined with other proposed methods and be applied together therewith unless each proposed method conflicts with other proposed methods.

Before describing proposed methods of the present disclosure, the overall operation processes of the UE, the BS, and the network for implementing the proposed methods of the present disclosure will now be described.

Figure 9:
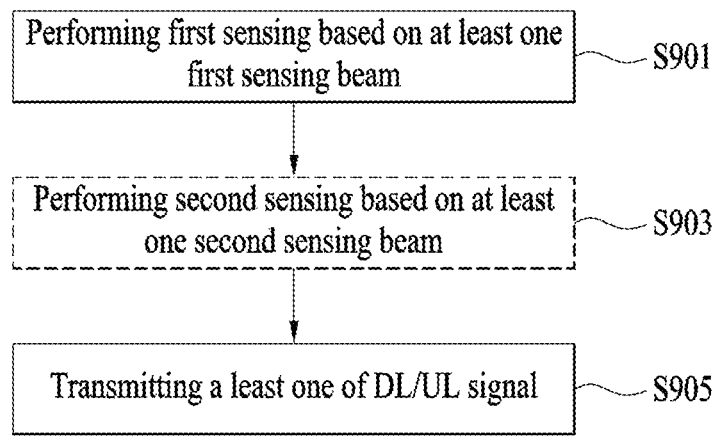
FIGS. 9, 10 and 11 are diagrams illustrating overall operation processes of a UE and a BS according to an embodiment of the present disclosure.

FIG. 9 is a diagram illustrating an overall operation process of the UE or the BS for transmitting a DL/UL signal based on proposed methods of the present disclosure.

Referring to FIG. 9, the UE or the BS may perform first sensing based on at least one first sensing beam (S901). In this case, the at least one first sensing beam may be a beam that covers a plurality of Tx beams. One first sensing beam may cover all of the plural Tx beams, or a plurality of sensing beams may cover corresponding Tx beams, respectively.

The first sensing may be performed based on at least one of [Proposed Method #1] to [Proposed Method #3].

When it is determined that at least one of the plural Tx beams is idle in the first sensing, the UE or the BS may perform second sensing based on at least one second sensing beam (S903). In this case, the at least one second sensing beam may be a beam that covers the plural Tx beams. One second sensing beam may cover all of the plural Tx beams or a plurality of sensing beams may cover corresponding Tx beams, respectively.

The second sensing may be performed based on at least one of [Proposed Method #1] to [Proposed Method #3]. Meanwhile, step S903 may be omitted when [Proposed Method #1] is implemented alone or continuous transmission between a configured grant-physical uplink shared channel (CG-PUSCH) and a dynamic grant-physical uplink shared channel (DG-PUSCH) is allowed in [Proposed Method #3] (e.g., conditions of [Embodiment #3-1] of [Proposed Method #3] are satisfied).

Based on at least one Tx beam being idle as a result of determination through the first sensing and/or the second sensing, the UE may transmit at least one UL signal corresponding to a Tx beam determined to be idle, or the BS may transmit at least one DL signal corresponding to a Tx beam determined to be idle (S905). In this case, the UL signal or the DL signal transmitted by the UE or the BS may be based on at least one of [Proposed Method #1] to [Proposed Method #3].

Figure 10:
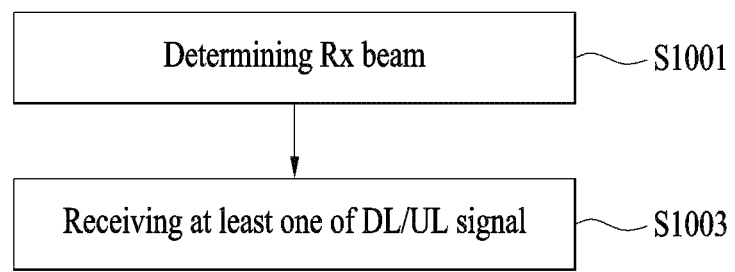

FIG. 10 is a diagram illustrating an overall operation process of the UE or the BS for receiving a DL/UL signal based on proposed methods of the present disclosure.

Referring to FIG. 10, the UE or the BS may determine at least one Rx beam for receiving at least one DL signal or at least one UL signal through at least one Tx beam (S1001).

In addition, the UE or the BS may receive the at least one DL signal or at least one UL signal transmitted based on at least one of [Method #1] to [Method #3] through the at least one Rx beam (S1003).

Figure 11:
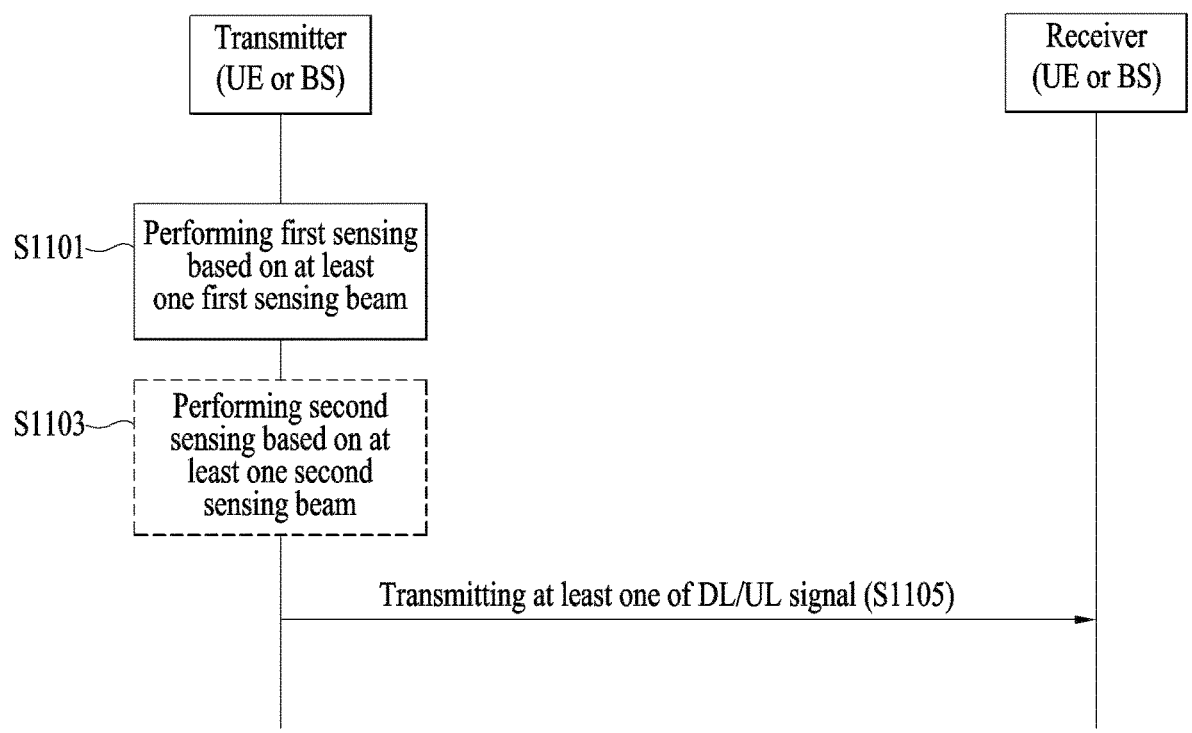

FIG. 11 is a diagram illustrating an overall operation process of a network for transmitting a DL/UL signal based on the proposed methods of the present disclosure.

Referring to FIG. 11, the UE or the BS may perform first sensing based on at least one first sensing beam (S1101). In this case, the at least one first sensing beam may be a beam that covers a plurality of Tx beams. One first sensing beam may cover all of the plural Tx beams or the plural first sensing beams may cover corresponding Tx beams, respectively.

The first sensing may be performed based on at least one of [Proposed Method #1] to [Proposed Method #3].

When it is determined that at least one of the plural Tx beams is idle in the first sensing, the UE or the BS may perform second sensing based on at least one second sensing beam (S1103). In this case, the at least one second sensing beam may be a beam that covers the plural Tx beams. One second sensing beam may cover all of the plural Tx beams or a plurality of sensing beams may cover corresponding Tx beams, respectively.

The second sensing may be performed based on at least one of [Proposed Method #1] to [Proposed Method #3]. Meanwhile, step S1103 may be omitted when [Proposed Method #1] is implemented alone or continuous transmission between a CG-PUSCH and a DG-PUSCH is allowed in [Proposed Method #3] (e.g., conditions of [Embodiment #3-1] of [Proposed Method #3] are satisfied).

Based on at least one Tx beam being idle as a result of determination through the first sensing and/or the second sensing, the UE may transmit at least one UL signal corresponding to a Tx beam determined to be idle, or the BS may transmit at least one DL signal corresponding to a Tx beam determined to be idle (S1105). In this case, the UL signal or the DL signal transmitted by the UE or the BS may be based on at least one of [Proposed Method #1] to [Proposed Method #3].

[Proposed Method #1]

(i) Method of determining one LBT type among wide-beam LBT based on random backoff counter-based LBT (e.g., Cat-3 LBT or Cat-4 LBT) and narrow-beam LBT based on random backoff counter-based LBT (e.g., Cat-3 LBT or Cat-4 LBT), for transmission of a specific beam direction or multibeam transmission multiplexed by TDM and/or SDM, and (ii) method of differently configuring an ED threshold according to an LBT type and a transmission type (e.g., unicast and/or broadcast) and method of sharing a COT Embodiment #1-1

Method of selecting an LBT method according to the capability of the UE (e.g., wide-beam LBT is performed when the UE is incapable of performing narrow-beam LBT)

In this case, the capability of the UE may mean a beam correspondence (BC) capability. In addition, when the UE does not support the BC capability so that the UE requires UL beam management in order to satisfy BC requirements, only wide-beam LBT may be allowed for the UE. Further, only wide-beam LBT may always be allowed for the UE before UL beam management.

Embodiment #1-2

Method of selecting the LBT method in consideration of COT sharing (e.g., if COT is allowed (or performed), narrow-beam LBT is performed and, otherwise, wide-beam LBT is performed.)

Embodiment #1-3

Method of selecting the LBT method according to the Tx length of a Tx beam (e.g., if the Tx length is longer than or equal to a threshold, narrow-beam LBT is performed and, if the Tx length is shorter than the threshold, wide-beam LBT is performed.)

Here, in the case of multibeam transmission, a Tx beam (or reference beam) to be compared with the threshold may be determined based on a beam having the longest Tx length among beams to be multiplexed or based on a beam previously configured/indicated by the BS or a beam randomly selected by the UE.

Embodiment #1-4

Method of differently configuring/allowing a maximum channel occupancy time (MCOT) according to the LBT method (e.g., according to whether LBT is wide-beam LBT or narrow-beam LBT)

Embodiment #1-5

Method of selecting the LBT method according to the number of multiple beams to be transmitted in a COT (e.g., if the number of Tx beams is less than a threshold, narrow-beam LBT is performed and, if the number of Tx beams is greater than the threshold, wide-beam LBT is performed.)

Embodiment #1-6

Method of differently configuring an ED threshold to be used to perform random backoff counter-based LBT (e.g., Cat-3 LBT or Cat-4 LBT) according to whether transmission is broadcast transmission after wide-beam LBT or unicast transmission after narrow-beam LBT (in this case, COT sharing is not allowed for wide-beam LBT and a COT sharing operation may be supported only when narrow-beam LBT is performed.)

Here, the wide-beam may mean a beam group including a set of specific beams. If the beam group includes omnidirectional beams, this may mean O-LBT. In addition, the thresholds in [Embodiment #1-3] and [Embodiment #1-4] may be the same or different. The thresholds may be based on a value previously configured/indicated by the BS or defined in the standard.

In the high frequency U-band, DL/UL transmission with directionality may be performed in a specific beam direction through beamforming, rather than omnidirectionally. Accordingly, it may be efficient to perform LBT in a specific beam direction to be transmitted, rather than omnidirectionally, and to perform transmission in areas affected by interference of a corresponding beam. However, according to the capability of the UE, narrow-beam LBT performed only in a specific beam direction may not be supported. In addition, even if the UE supports both LBT methods, it is necessary to determine an LBT method to be performed before actual transmission.

For transmission in a specific beam direction or multibeam transmission, both narrow-beam LBT and wide-beam LBT may be applied. Here, since COT sharing may or may not be allowed depending on the type of LBT to be performed, the BS or the UE may selectively determine the LBT method depending on whether to allow COT sharing.

In particular, in order to perform multibeam transmission multiplexed by TDM and/or SDM in a COT, since LBT may have to be performed for all beam directions and interference areas in which multiplexed transmission is performed in the COT, narrow-beam LBT may be sequentially performed in individual directions of beams to be multiplexed or LBT may be simultaneously performed in all directions of beams to be multiplexed.

In addition, the type of LBT (e.g., wide-beam LBT or narrow-beam LBT) and the ED threshold may be differently selected, when performing broadcast transmission such as transmission of an SSB or a beam management SRS or performing unicast transmission such as transmission of a PDSCH or a PUSCH. In addition, the type of LBT to be used for LBT among wide-beam LBT and narrow-beam LBT may be determined according to the Tx lengths of beams or the number of beams, to be multiplexed.

Since a UE that does not support narrow-beam LBT due to the capability thereof may perform only wide-beam LBT, the UE may always perform transmission in a specific beam direction. Alternatively, the UE that does not support narrow-beam LBT may always perform wide-beam LBT based on random backoff counter-based LBT (Cat-3 LBT or Cat-4 LBT) during multibeam transmission and start DL/UL transmission when wide-beam LBT is successful. In this case, the capability of the UE may mean a BC capability, and only wide-beam LBT may be allowed for the UE that does not support BC capability so that the UE requires UL beam management in order to satisfy BC requirements. In addition, only wide-beam LBT may always be allowed for the UE before UL beam management.

Meanwhile, requirements related to the BC capability are as follows.

1) A UE supporting beamCorrespondenceWithoutUL-BeamSweeping may properly match BC even without beam management such as UL beam sweeping and UL beam indication of the network. In this case, requirements such as minimum peak effective isotropic radiated power (EIRP) and spherical coverage should be satisfied even without beam management. Therefore, the UE supporting the corresponding capability (i.e., UE supporting beamCorrespondenceWithoutUL-BeamSweeping) may be allowed to perform narrow-beam LBT and may also be allowed to perform wide-beam LBT.

2) A UE that does not support beamCorrespondenceWithoutUL-BeamSweeping may satisfy requirements such as minimum peak EIRP and spherical coverage through a beam management process. Additionally, the UE that does not support beamCorrespondenceWithoutUL-BeamSweeping may also satisfy relaxed requirements of about 3 dB even without beam management.

Therefore, the UE that supports the corresponding capability (i.e., UE that does not support beamCorrespondenceWithoutUL-BeamSweeping) may not be allowed to perform narrow-beam LBT and may be allowed to perform only wide-beam LBT. Alternatively, even for the UE that supports the corresponding capability (i.e., a UE that does not support beamCorrespondenceWithoutUL-BeamSweeping) may not be allowed to perform narrow-beam LBT before the UL beam management process and may be allowed to perform only wide-beam LBT. However, narrow-beam LBT may also be performed after the UL beam management process.

On the other hand, a COT sharing operation that may transfer a COT acquired by succeeding in random backoff counter-based LBT (e.g., Cat-3 LBT or Cat-4 LBT) may be allowed only when narrow-beam LBT based on random backoff counter-based LBT (e.g., Cat-3 LBT or Cat-4 LBT) is performed and may not be allowed when wide-beam LBT based on random backoff counter-based LBT (e.g., Cat-3

LBT or Cat-4 LBT) is performed. In this case, the BS or UE may perform LBT by selecting one of wide-beam LBT and narrow-beam LBT according to whether to transfer the remaining COT to another node after the BS or the UE performs transmission.

In addition, when performing transmission in a specific beam direction or multibeam transmission, the LBT method may be selected according to the Tx length of a Tx beam. For example, if the Tx length is longer than a threshold, narrow-beam LBT may be performed and, if the Tx length is shorter than the threshold, wide-beam LBT may be performed.

The threshold serving as a criterion may be a value previously configured/indicated by the BS or defined in the standard.

In the case of multibeam transmission, a Tx beam to be compared with the threshold may be determined according to one of the following criteria, i.e., based on (i) a beam having the longest Tx length among beams to be multiplexed, (ii) a beam previously configured/indicated by the BS, or (iii) a beam arbitrarily selected by the UE.

Conversely, the Tx length may be differently configured depending on the type of LBT performed. For example, an MCOT of the BS or the UE may be differently configured depending on whether LBT performed is wide-beam LBT or narrow-beam LBT. For example, if the MCOT is up to 5 ms when the BS or the UE performs narrow-beam LBT, 3 ms, which is shorter than 5 ms, may be allowed as the MCOT length when the BS or the UE performs wide-beam LBT.

In the case of multibeam transmission, the LBT method may be selected according to the number of multiple beams to be transmitted in the COT. For example, if the number of Tx beams is less than the threshold, narrow-beam LBT may be performed and, when the number of Tx beams is greater than the threshold, wide-beam LBT may be performed. The threshold, which is a criterion, may be a value indicated by the BS or defined in the standard.

An ED threshold, which is a criterion to determine whether a channel is idle or busy when LBT is performed, may be differently configured depending on whether transmission is broadcast transmission after wide-beam LBT or unicast transmission after narrow-beam LBT. For example, since it is necessary to transmit, for example, an SSB or a beam management SRS in multiple beam directions through beam sweeping, the ED threshold to be used when wide-beam LBT based on random backoff counter-based LBT (e.g., Cat-3 LBT or Cat-4 LBT) is performed may be configured as a higher value than an ED threshold to be used when narrow-beam LBT based on random backoff counter-based LBT (e.g., Cat-3 LBT or Cat-4 LBT) performed for transmission in a specific beam direction is performed. In this case, COT sharing may not be allowed for wide-beam LBT and the COT sharing operation may be supported only when narrow-beam LBT is performed.

According to [Embodiment #1-1], an error in the operation of the UE may be eliminated and an operation suitable for the capacity of the UE may be performed, by determining whether to perform narrow-beam LBT based on whether the UE supports BC and whether beam management is configured. In addition, when the capability of the UE fails to support narrow-beam LBT (i.e., when the UE does not have a capability to perform narrow-beam LBT), collision with other transmissions may be prevented by conservatively performing wide-beam LBT.

According to [Embodiments #1-2] to [Embodiments #1-6], one node may be prevented from excessively occupying a relatively wide range of space for a long time through wide-beam LBT, so that the influence of one node on transmission and reception of other nodes may be minimized.

[Proposed Method #2] Case in which Independent Per-Beam LBT is Performed for TDM and/or SDM-Based Multibeam Transmission in a Plurality of Beam Directions in a COT Embodiment #2-1

Random backoff counter-based LBT (e.g., Cat-3 LBT or Cat-4 LBT) is performed individually and simultaneously for beams. DL/UL transmission corresponding to a beam direction in which LBT is completed first (e.g., LBT corresponding to a beam determined first to be idle) is not performed and is deferred through self-deferral until LBT of the remaining beam directions is completed. After LBT of all beams is completed or immediately before LBT of a specific direction is completed (e.g., immediately before DL/UL transmission through multiple beams), it is shortly determined whether all beam directions are idle or busy. DL/UL transmission corresponding to at least one beam direction in which LBT is successful (e.g., at least one beam direction determined to be idle) may be performed through SDM and/or TDM. When it is shortly determined whether all beam directions are idle or busy, idle or busy may be determined by performing single CCA slot LBT or LBT (e.g., Cat-2 LBT) rather than backoff counter-based LBT.

Here, beams for which random backoff counter-based LBT (e.g., Cat-3 LBT or Cat-4 LBT) are individually and simultaneously performed and for which CCA slot LBT or LBT (e.g., Cat-2 LBT) that is not based on random backoff counter-based LBT is shortly performed may mean sensing beams. In addition, one sensing beam may correspond to one Tx beam among a plurality of Tx beams multiplexed by TDM and/or SDM. DL/UL transmission corresponding to the sensing beam may mean DL/UL transmission in which transmission is performed through a Tx beam corresponding to the sensing beam.

Here, each individual beam may have a backoff counter value according to the configuration/indication of the BS. For example, when N Tx beams are multiplexed, and random backoff counter-based LBT (e.g., Cat-3 LBT or Cat-4 LBT) is simultaneously performed through N sensing beams corresponding to the N Tx beams, the backoff counter value may be independently determined for each of the N sensing beams. In addition, the backoff counter value may be decreased only with respect to a sensing beam determined to be idle as a result of performing LBT simultaneously and in parallel upon the N sensing beams. Alternatively, all of multiplexed beams may have a common backoff counter value. For example, when the N Tx beams are multiplexed, and random backoff counter-based LBT (e.g., Cat-3 LBT or Cat-4 LBT) is performed upon the N sensing beams corresponding to the N Tx beams, the common backoff counter value may be determined for all of the N sensing beams. In addition, the common backoff counter value may be decreased only when it is determined that all of the N sensing beams are idle or it is determined that a certain number of sensing beams among the N sensing beams are idle as a result of performing LBT simultaneously and in parallel upon the N sensing beams.

In the case of SDM, since it may be difficult to drop only some beams and start transmission, DL/UL transmission for SDM may be performed only when LBT for all beams is successful. If LBT for partial beams fails, DL/UL transmission for all beams may be dropped and an LBT procedure may be performed again. However, in the case of SDM and/or TDM, if only part of the multiplexed beams succeed in LBT (e.g., the backoff counter value according to LBT becomes 0, or the backoff counter value becomes 0 before a transmission starting timing so that self-deferral is performed and short CCA is successful immediately before transmission starts), only DL/UL transmission for beams corresponding to successful LBT may be performed and only DL/UL transmission for beams corresponding to the remaining failed LBT may be dropped.

In Embodiment #1-1, SDM in the COT may mean that multiple beams are multiplexed using different spatial regions at the same time (e.g., the same slot) in the COT. TDM in the COT may mean that multiple beams are multiplexed at a plurality of times (e.g., a plurality of slots) in the COT. Therefore, if multiple beams are multiplexed by SDM and TDM, this may mean that a plurality of beam groups (including a part of multiple beams) multiplexed by SDM at the same time (e.g., the same slot) among multiple beams is multiplexed by TDM at a plurality of times (e.g., a plurality of slots) in the COT.

2. Embodiment #2-2

A representative beam direction is determined among a plurality of multiplexed beams. Random backoff counter-based LBT (e.g., Cat-3 LBT or Cat-4 LBT) is performed only in the representative beam direction. LBT (e.g., Cat-2 LBT), rather than random backoff-based LBT, or single CCA slot LBT is performed in the remaining beam directions immediately before LBT in the representative beam direction is completed (e.g., immediately before DL/UL transmission through multiple beams). In addition, beams corresponding to beam directions in which LBT (e.g., Cat-2 LBT), rather than random backoff-based LBT, or single CCA slot LBT is successful may be transmitted through SDM and/or TDM.

[Method of Determining a Representative Beam Direction to Perform Random Backoff Counter-Based LBT (e.g., Cat-3 LBT or Cat-4 LBT)]

1) Beam direction to be transmitted first in the case of TDM
2) Beam direction with the largest EIRP value
3) Beam direction arbitrarily selected by the UE
4) Beam direction previously configured/indicated by the BS
5) Beam direction in which the largest backoff counter value is determined Here, a beam upon which LBT is to be performed may mean a sensing beam. In addition, one sensing beam may correspond to one Tx beam among a plurality of Tx beams multiplexed by TDM and/or SDM. DL/UL transmission corresponding to the sensing beam may mean DL/UL transmission in which transmission is performed through a Tx beam corresponding to the sensing beam.

Here, [Embodiment #2-2] may be applied only when the UE or the BS has a capability to simultaneously perform LBT (e.g., Cat-3 LBT or Cat-2 LBT) in beam directions to be multiplexed by SDM and/or TDM. When Cat-4 based LBT is used, one contention window size (CWS) value may be updated based on A/N according to the configuration/indication of the BS or the CWS value may be independently updated for each beam.

In the case of SDM, since it may be difficult to drop only some beams and start transmission, DL/UL transmission for SDM may be performed only when LBT for all beams is successful. If LBT for partial beams fails, DL/UL transmission for all beams may be dropped and an LBT procedure may be performed again. However, in the case of SDM and/or TDM, if only part of the multiplexed beams succeed in LBT (e.g., the backoff counter value according to LBT becomes 0, or the backoff counter value becomes 0 before a transmission starting timing so that self-deferral is performed and short CCA is successful immediately before transmission starts), only DL/UL transmission for beams corresponding to successful LBT may be performed and only DL/UL transmission for beams corresponding to the remaining failed LBT may be dropped.

The 3GPP TS 37.213 document related to a channel access procedure of Rel-16 NR-U discloses definition of multichannel access procedures and channels of Type A/B. Type A indicates a method of performing individual Cat-4 LBT for each channel. Type B indicates a method of performing Cat-4 LBT for one representative channel and performing single CCA slot LBT or Cat-2 LBT for the remaining channels immediately before Cat-4 LBT of the representative channel is completed, thereby performing DL/UL transmission for channels for which LBT is successful.

In the high-frequency U-band of 52.6 GHz, the concept of a multichannel access procedure of Type A/B may be extensively applied to the spatial domain so that the multichannel access procedure may be used when independent per-beam LBT is performed based on random backoff counter-based LBT (e.g., Cat-3 LBT or Cat-4 LBT) for transmission of multiple beams multiplexed by TDM and/or SDM.

First, according to [Embodiment #2-1], similar to the multichannel access procedure of Type A, random backoff counter-based LBT (e.g., Cat-3 LBT or Cat-4 LBT) is performed individually and simultaneously for a plurality of beams to be transmitted through SDM and/or TDM. For a beam direction in which LBT is completed first (e.g., LBT corresponding to a beam determined first to be idle), DL/UL transmission corresponding to the beam direction in which LBT is completed first is not performed and is deferred through self-deferral until LBT of the remaining beam directions is completed. It is shortly determined whether all beam directions are idle or busy after LBT of all beams is completed or immediately before LBT of a specific direction is completed (e.g., immediately before DL/UL transmission through multiple beams) and DL/UL transmission corresponding to at least one beam direction in which transmission is successful (e.g., at least one beam direction determined to be idle) may be performed through SDM and/or TDM.

When it is shortly determined whether all beam directions are idle or busy, idle or busy may be determined by performing single CCA slot LBT or Cat-2 LBT which is not based on random backoff.

Figures 12A, 12B:
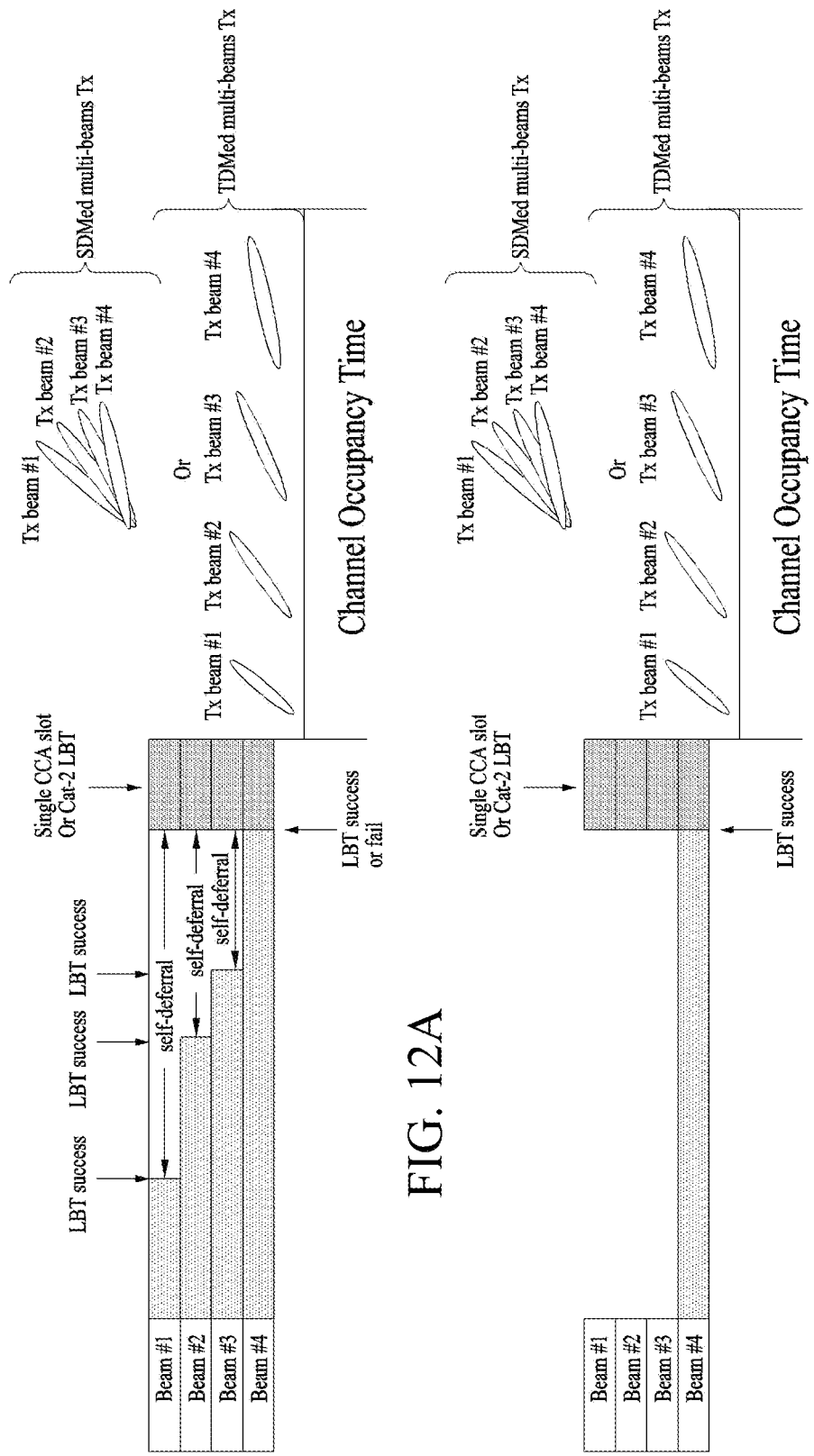
FIGS. 12A and 12B are diagrams illustrating a method of performing multibeam transmission according to an embodiment of the present disclosure.

For example, referring to FIG. 12A, four Tx beams (e.g., Tx beam #1 to Tx beam #4) corresponding to four beams from beam #1 to beam #4, respectively, are scheduled through SDM and/or TDM in a COT. Here, beams #1 to #4 may mean sensing beams corresponding to the four Tx beams, respectively. In other words, beams #1 to #4 may mean sensing beams #1 to #4, respectively.

The BS or the UE may simultaneously start random backoff counter-based LBT (e.g., Cat-3 LBT or Cat-4 LBT) for the four beams from beam #1 to beam #4. If LBT for beam #1 is completed earlier than LBT for beams #2 to #4, DL/UL transmission through Tx beam #1 corresponding to beam #1 does not immediately start. In other words, DL/UL transmission through Tx beam #1 is not performed until LBT for beams #2 to #4 is completed and DL/UL transmission through Tx beam #1 may wait through self-deferral.

Next, if LBT for beam #2 to beam #4 is sequentially completed, single CCA slot LBT or LBT (e.g., Cat-2 LBT), other than random backoff-based LBT, is performed immediately before an LBT ending timing for beam #4 which is completed last or immediately before DL/UL transmission multiplexed by SDM and/or TDM (e.g., immediately before the COT including DL/UL transmission multiplexed by SDM and/or TDM starts) to determine whether the beams are idle or busy. If it is determined that beams #1 to #4 are idle, DL/UL transmission multiplexed by SDM and/or TDM may be performed in the corresponding COT.

However, if random backoff-based LBT (e.g., Cat-3 LBT or Cat-4 LBT) for at least one beam (e.g., beam #4) among beam #1 to beam #4 is not successful (i.e., random backoff-based LBT fails) until the COT starts or until a predetermined time from a time immediately before the COT starts (e.g., until a time required to perform Cat-2 LBT from a time immediately before the COT starts), only single CCA slot or LBT (e.g., Cat-2 LBT), other than random backoff-based LBT, is performed for the remaining beams (e.g., beam #1 to beam #3), except for the failed beam, to determine whether corresponding beams are idle or busy. If it is determined that beam #1 to beam #3 are idle, DL/UL transmission multiplexed by SDM and/or TDM may be performed in the corresponding COT.

Here, the single CCA slot refers to a unit to perform channel measurement in order to determine whether a channel is idle/busy when random backoff counter-based LBT (e.g., Cat-3 LBT or Cat-4 LBT) is performed. When a channel is idle, the backoff counter value may be decreased by one.

In this case, each individual beam may have the backoff counter value according to the configuration/indication of the BS. For example, when N Tx beams are multiplexed, and random backoff counter-based LBT (e.g., Cat-3 LBT or Cat-4 LBT) is simultaneously performed through N sensing beams corresponding to the N Tx beams, the backoff counter value may be independently determined for each of the N sensing beams. In addition, the backoff counter value may be decreased only for a sensing beam determined to be idle as a result of performing LBT upon the N sensing beams simultaneously and in parallel. Alternatively, all of the multiplexed beams may have a common backoff counter value. For example, when the N Tx beams are multiplexed, and random backoff counter-based LBT (e.g., Cat-3 LBT or Cat-4 LBT) is performed upon the N sensing beams corresponding to the N Tx beams, the common backoff counter value may be determined for all of the N sensing beams. In addition, the common backoff counter value may be decreased only when it is determined that all of the N sensing beams are idle or it is determined that a certain number of sensing beams among the N sensing beams are idle as a result of performing LBT simultaneously and in parallel upon the N sensing beams. In the case of SDM, since it may be difficult to drop only some beams and start transmission, DL/UL transmission for SDM may be performed only when LBT for all beams is successful. If LBT for partial beams fails, DL/UL transmission for all beams may be dropped and an LBT procedure may be performed again. However, in the case of SDM and/or TDM, if sensing beams corresponding to part of the multiplexed Tx beams succeed in LBT (e.g., the backoff counter value according to LBT becomes 0, or the backoff counter value becomes 0 before a transmission starting timing so that self-deferral is performed and short CCA is successful immediately before transmission starts), only DL/UL transmission for Tx beams related to the sensing beams corresponding to successful LBT may be performed and only DL/UL transmission for Tx beams related to sensing beams corresponding to the remaining failed LBT may be dropped.

According to [Embodiment #2-1], DL/UL signals may be predictably transmitted at scheduling timings in the same COT through multiplexed Tx beams. In other words, even if LBT success timings of sensing beams corresponding to the multiplexed Tx beams are different, DL/UL transmission may be performed at the scheduling timings of the DL/UL signals, thereby reducing predictability and complexity of transmission. In addition, LBT is performed upon all sensing beams corresponding to all the Tx beams, so that the reliability of a measurement result for the Tx beams may be increased and collision with other signals may be minimized. In addition, when a backoff counter value corresponding to a specific sensing beam becomes 0 and DL/UL transmission is started through a Tx beam corresponding to the specific beam, since LBT and transmission are incapable of being simultaneously performed, DL/UL transmissions corresponding to the remaining sensing beams may be automatically dropped. Accordingly, from the viewpoint of overall transmission, a DL/UL transmission opportunity may decrease and dropped DL/UL transmission needs to be rescheduled. Therefore, transmission delay may increase and resource efficiency may decrease. According to [Embodiment #2-1], the above-described problems may be solved/prevented.

Meanwhile, according to [Embodiment #2-2], similar to the multichannel access procedure of Type B, a representative beam direction is determined among a plurality of beams to be transmitted through SDM and/or TDM. Random backoff counter-based LBT (e.g., Cat-3 LBT or Cat-4 LBT) is performed only in the representative beam direction. LBT (e.g., Cat-2 LBT), rather than random backoff-based LBT, or single CCA slot LBT is performed in the remaining beam directions immediately before LBT in the representative beam direction is completed (e.g., immediately before DL/UL transmission through multiple beams). In addition, DL/UL transmission corresponding to beam directions in which LBT (e.g., Cat-2 LBT), rather than random backoff-based LBT, or single CCA slot LBT is successful may be performed through SDM and/or TDM.

For example, referring to FIG. 12B, a situation in which beam #4 among beams #1 to #4 is determined as a representative beam is illustrated. In this case, random backoff counter-based LBT (Cat-3 LBT or Cat-4 LBT) is performed only for beam #4. When it is determined that beam #4 is idle through LBT for beam #4, LBT (e.g., Cat-2 LBT), which is not based on random backoff-based LBT, or single CCA slot LBT is performed for beam #1 to beam #4 immediately before LBT for beam #4 is completed (e.g., immediately before DL/UL transmission through multiple beams). In addition, DL/UL transmission corresponding to beam directions that have succeeded in single CCA slot LBT or LBT (e.g., Cat-2 LBT), rather than random backoff-based LBT, may be performed through SDM and/or TDM in the COT. Here, beam #1 to beam #4 may mean sensing beams corresponding to four Tx beams, respectively. In other words, beams #1 to #4 may mean sensing beam #1 to sensing beam #4, respectively.

The direction of the representative beam to be subjected to random backoff counter-based LBT (e.g., Cat-3 LBT or Cat-4 LBT) may be determined by applying one method among 1) the direction of a beam to be transmitted first in the case of TDM, 2) the direction of a beam having the largest EIRP value, 3) a beam direction arbitrarily selected by the UE, 4) a beam direction previously configured/indicated by the BS, and 5) a beam direction in which the largest backoff counter value is determined. Here, the direction of the representative beam may be applied only when the UE or the BS has a capability to simultaneously perform LBT (e.g., Cat-3 LBT or Cat-2 LBT) in beam directions to be subject to SDM and/or TDM.

When Cat-4 based LBT is used, one CWS value may be updated based on A/N or CWS values may be independently updated for respective beams, according to the configuration/indication of the BS.

In the case of SDM, since it may be difficult to drop only some beams and start transmission, DL/UL transmission for SDM may be performed only when LBT for all beams is successful. If LBT for partial beams fails, DL/UL transmission for all beams may be dropped and an LBT procedure may be performed again. However, in the case of SDM and/or TDM, if only part of the multiplexed beams succeed in LBT (e.g., the backoff counter value according to LBT becomes 0, or the backoff counter value becomes 0 before a transmission starting timing so that self-deferral is performed and short CCA is successful immediately before transmission starts), only DL/UL transmission for beams corresponding to successful LBT may be performed and only DL/UL transmission for beams corresponding to the remaining failed LBT may be dropped.

According to [Embodiment #2-2], when a plurality of Tx beams is multiplexed, there is no need to perform LBT corresponding to all Tx beams and only LBT corresponding to one beam may be performed, so that complexity of a procedure and processing complexity of the UE due to LBT may be reduced.

Figure 13:
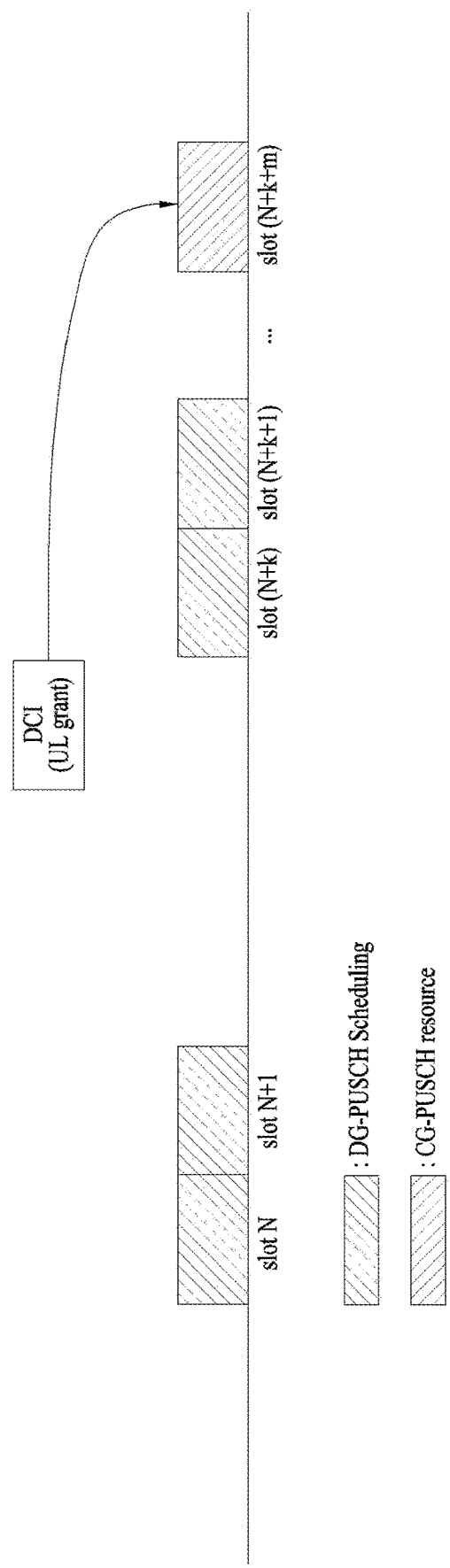
FIG. 13 is a diagram illustrating continuous transmission of a CG-PUSCH and a DG-PUSCH according to an embodiment of the present disclosure.

[Proposed Method #3] Method of Performing CG-DG PUSCH Back-to-Back Transmission According to the Following Conditions when there is a Scheduled DG-PUSCH in the Middle of CG-PUSCH Transmission while a CG-PUSCH is Transmitted after Performing Random Backoff Counter-Based LBT (e.g., Cat-3 LBT or Cat-4 LBT) on a CG Resource Preconfigured by the BS For example, referring to FIG. 13, a DG-PUSCH may be scheduled in slot N+k+m through downlink control information (DCI) while the UE performs LBT (e.g., Cat-3 LBT or Cat-4 LBT) in order to transmit a CG-PUSCH in slot (N+k) and slot (N+k+1). For example, DG-PUSCH scheduling may be confirmed through the DCI before LBT is performed or LBT is successful. Alternatively, DG-PUSCH scheduling may be confirmed through the DCI after LBT is successful, before the CG-PUSCH is transmitted, or after the CG-PUSCH is transmitted.

In this case, conditions for continuously transmitting the DG-PUSCH after transmission of the CG-PUSCH without separate LBT for the DG-PUSCH will be described.

A transmission direction of the CG-PUSCH may be preconfigured through spatialrelationinfo or may be indicated through an SRS resource indicator (SRI) field in activation DCI. In addition, if a unified transmission configuration indication (TCI) state is supported and a TCI corresponds to a joint TCI and/or a DL/UL separate TCI, the transmission direction of the CG-PUSCH may be indicated through a UL TCI state.

1. Embodiment #3-1

DG-PUSCH transmission may be continuously performed immediately after CG-PUSCH transmission without LBT, when (i) there is no gap between the ending symbol of a CG-PUSCH and the starting symbol of a DG-PUSCH on the time axis, (ii) the bandwidth of the CG-PUSCH transmitted on the frequency axis and the bandwidth of the scheduled DG-PUSCH are the same or the bandwidth to which the DG-PUSCH is allocated is a subset of the bandwidth to which the CG-PUSCH is allocated, and (iii) a Tx beam direction indicated for the DG-PUSCH is included in a Tx beam direction of the CG-PUSCH or the Tx beam direction indicated for the DG-PUSCH is equal to the Tx beam direction of the CG-PUSCH.

Here, the total sum of transmission lengths of the DG-PUSCH and the CG-PUSCH should not exceed an MCOT.

2. Embodiment #3-2

To secure an LBT gap for the DG-PUSCH before DG-PUSCH transmission, symbols of at least one last CG-PUSCH prior to symbol i of slot n located before scheduled DG-PUSCHs may be dropped according to the mechanism of Clause 11.1 of 3GPP TS 38.213, as described in Clause 4.2.1.0.1 of 3GPP TS 37.213, when (i) there is a gap between the ending symbol of the CG-PUSCH and the starting symbol of the DG-PUSCH on the time axis, (ii) the bandwidth of the CG-PUSCH transmitted on the frequency axis and the bandwidth of the scheduled DG-PUSCH are not the same or the bandwidth to which the DG-PUSCH is allocated is not a subset of the bandwidth of the CG-PUSCH, or (iii) a beam direction indicated for the DG-PUSCH is not included in a Tx beam direction of the CG-PUSCH or the beam direction indicated for the DG-PUSCH is not equal to the Tx beam direction of the CG-PUSCH.

Here, a value of each of X, Y, and Z for X symbols, Y CG-PUSCHs, or Z slots, to be dropped for the LBT gap, may use a value specified in the specification or a value previously configured/indicated by the BS through a higher layer signal (e.g., radio resource control (RRC)), a physical layer signal (e.g., DCI), or a combination of the higher layer signal and the physical layer signal.

In the proposed methods, DG-PUSCH to CG-PUSCH back-to-back transmission may be performed by changing the order, i.e., the CG-PUSCH to the DG-PUSCH or the DG-PUSCH to the CG-PUSCH. However, in [Embodiment #3-2], when the priority of the DG-PUSCH is higher than that of the CG-PUSCH, if there is a gap or an LBT subband resource of the DG-PUSCH and an LBT subband resource of the CG-PUSCH are different, the UE may drop transmission of the CG-PUSCH following the DG-PUSCH. Here, if the priority of the DG-PUSCH is higher than that of the CG-PUSCH, this may be interpreted as follows.

1) Since the DG-PUSCH is a scheduling-based signal, the DG-PUSCH has a higher priority than the CG-PUSCH.

2) A channel access priority class (CAPC) value configured for the DG-PUSCH is smaller than a CAPC value configured for the CG-PUSCH.

Further, including the Tx beam direction of the DG-PUSCH in the Tx beam direction of the CG-PUSCH may mean that the Tx beam of the CG-PUSCH has a relatively large bandwidth relative to the Tx beam of the DG-PUSCH Tx beam, so that the Tx beam of the CG-PUSCH includes all of an interference area in which the DG-PUSCH has an effect on interference when the DG-PUSCH is transmitted in a specific beam direction.

Furthermore, if the beam directions of the CG-PUSCH and the DG-PUSCH are the same, this may mean that the beam directions indicated to the CG-PUSCH and the DG-PUSCH are indicated by the same spatialrelationinfo, the same SRI field, or the same joint TCI state (UL TCI state in the case of a DL/UL separate TCI).

In LTE LAA, when the DG-PUSCH is scheduled with an AUL-PUSCH (autonomous UL access) in consecutive subframes without a gap, a transmission operation without LBT is supported (Clause 4.2.1 of 3GPP TS 37.213). Similarly, in a situation in which the CG-PUSCH is being transmitted based on Cat-4 LBT in NR-U, if the DG-PUSCH is consecutively scheduled with a CG time axis resource configured for the UE without a gap (i.e., CG-DG back-to-back scheduling), the DG-PUSCH may be transmitted without LBT. However, in NR-U, a plurality of LBT subbands may be included in the bandwidth of the CG resource because the bandwidth of the CG resource configured for the UE is larger than 20 MHz, unlike LTE. Therefore, in order to continuously transmit the DG-PUSCH without LBT using a COT obtained through the CG-PUSCH, the frequency band of the scheduled DG-PUSCH should be included in the frequency band of the CG-PUSCH. In other words, the LBT subband of the DG-PUSCH should be a subset of the LBT subband of the CG-PUSCH or the LBT subband of the DG-PUSCH should be the same as the LBT subband of the CG-PUSCH. In addition, as in LTE LAA, there should be no gap between the CG-PUSCH and the DG-PUSCH. In other words, when there is no gap between the ending symbol of the CG-PUSCH and the starting symbol of the DG-PUSCH on the time axis and when the LBT subband of the CG-PUSCH transmitted on the frequency axis and the LBT subband of the scheduled DG-PUSCH are the same or the LBT subband of the DG-PUSCH is included in the LBT subband resource of the CG-PUSCH, the DG-PUSCH may be transmitted immediately after the CG-PUSCH without LBT. For example, in the case of FIG. 13, when the ending symbol of the CG-PUSCH is symbol #13 of slot (N+k+1) and the starting symbol of the DG-PUSCH is symbol #0 of slot (N+k+2) (i.e., m=2) or when the ending symbol of the CG-PUSCH is symbol #1 of slot (N+k+1) and the starting symbol of the DG-PUSCH is symbol #(1+1) of slot (N+k+1) (i.e., m=1), if the LBT subband of the CG-PUSCH and the LBT subband resource of the scheduled DG-PUSCH are the same or the LBT subband resource of the DG-PUSCH is included in the LBT subband of the CG-PUSCH, the DG-PUSCH may be transmitted without LBT immediately after the CG-PUSCH.

The table below has been excerpted from a part related to AUL-DG PUSCH back-to-back transmission of feLAA and CG-DG PUSCH back-to-back transmission of NR-U of Clause 4.2 of the specification 3GPP TS 37.213 which accurately discloses back-to-back transmission described above.

TABLE 5

```
For UL transmission(s) following autonomous UL
transmission(s), the following are applicable:
- If a UE is scheduled by an eNB to transmit on
channel c_i by a UL grant received on
channel c_j, i ≠ j, and if the UE is transmitting
using autonomous UL on channel c_i, the UE
shall terminate the ongoing PUSCH transmissions
using the autonomous UL at least one
subframe before the UL transmission
according to the received UL grant.
- If a UE is scheduled by a UL grant received from
an eNB on a channel to transmit a
PUSCH transmission(s) starting from subframe
n on the same channel using Type 1 channel
access procedure and if at least for the first scheduled
subframe occupies N_RB^UL resource
blocks and the indicated PUSCH starting
position is OFDM symbol zero, and if the UE starts
autonomous UL transmissions before subframe n
using Type 1 channel access procedure on
the same channel, the UE may transmit UL
transmission(s) according to the received UL grant
from subframe n without a gap, if the priority class
value of the performed channel access
procedure is larger than or equal to priority
class value indicated in the UL grant, and the
autonomous UL transmission in the subframe
preceding subframe n shall end at the last
OFDM symbol of the subframe regardless
of the higher layer parameter endingSymbolAUL.
The sum of the lengths of the autonomous UL
transmission(s) and the scheduled UL
transmission(s) shall not exceed the maximum
channel occupancy time corresponding to the
priority class value used to perform the autonomous
uplink channel access procedure.
Otherwise, the UE shall terminate the
ongoing autonomous UL transmission at least one
subframe before the start of the UL transmission
according to the received UL grant on the same channel.
For UL transmission(s) following configured grant UL
transmission(s), the following are applicable:
- If a UE is scheduled to transmit UL transmission(s)
starting from symbol i in slot n
using Type 1 channel access procedures without
CP extension with a corresponding CAPC,
and if the UE starts configured grant UL transmissions
before symbol i in slot n using Type 1
```

TABLE 5-continued

```
channel access procedures with a corresponding
CAPC, and the scheduled UL transmission(s)
occupies all the RBs of the same channels occupied
by the configured grant UL
transmission(s) or all the RBs of a subset
thereof, the UE may directly continue to transmit the
scheduled UL transmission(s) to the corresponding
CAPC from symbol i in slot n without a
gap, if the CAPC value of the performed
channel access procedure is larger than or equal to
the CAPC value corresponding to the scheduled
UL transmission(s). The sum of the
transmission durations of the configured grant
UL transmission(s) and the scheduled UL
transmission(s) shall not exceed the MCOT duration
corresponding to the CAPC value used to
transmit the configured grant UL transmission(s).
Otherwise, the UE shall terminate the
configured grant UL transmission(s) by dropping
the transmission on the symbols of at least
the last configured grant UL transmission
before symbol i in slot n and attempt to transmit
the scheduled UL transmission(s) according to the
corresponding CAPC. The symbols of the
PUSCH transmission with a configured
grant in a slot is dropped according to the mechanism
in Clause 11.1 of [7, TS 38.213] relative to a
last symbol of a CORESET where the UE
detected the scheduling DCI. In this case,
if the UE cannot terminate the configured grant UL
transmission(s), the UE ignores the scheduling DCI.
```

Even in an NR system of a 60-GHz band, similar to NR-U, back-to-back transmission may be performed without LBT if the scheduled DG-PUSCH during transmission of the CG-PUSCH satisfies specific conditions. However, since transmission/reception of a specific beam direction should be considered in addition to time and frequency conditions in NR-U, additional conditions for Tx beam directions of the CG-PUSCH and the DG-PUSCH need to be considered.

Therefore, in the NR system of the 60-GHz band, DG-PUSCH transmission may be continuously performed immediately after CG-PUSCH transmission without LBT, when (i) there is no gap between the ending symbol of the CG-PUSCH and the starting symbol of the DG-PUSCH on the time axis, (ii) the bandwidth of the CG-PUSCH transmitted on the frequency axis and the bandwidth of the scheduled DG-PUSCH are the same or the bandwidth to which the DG-PUSCH is allocated is a subset of the bandwidth to which the CG-PUSCH is allocated, and (iii) a Tx beam direction indicated for the DG-PUSCH is included in a Tx beam direction of the CG-PUSCH or the Tx beam direction indicated for the DG-PUSCH is equal to the Tx beam direction of the CG-PUSCH.

Here, including the Tx beam direction of the DG-PUSCH in the Tx beam direction of the CG-PUSCH may mean that the Tx beam of the CG-PUSCH has a relatively large bandwidth relative to the Tx beam of the DG-PUSCH Tx beam, so that the Tx beam of the CG-PUSCH includes all of an interference area in which the DG-PUSCH has an effect on interference when the DG-PUSCH is transmitted in a specific beam direction. Furthermore, if the beam directions of the CG-PUSCH and the DG-PUSCH are the same, this may mean that the beam directions indicated to the CG-PUSCH and the DG-PUSCH are indicated by the same spatialrelationinfo, the same SRI field, or the same joint TCI state (UL TCI state in the case of a DL/UL separate TCI). The total sum of transmission lengths of the DG-PUSCH and the CG-PUSCH should not exceed an MCOT.

Similarly, conditions incapable of performing CG-DG PUSCH back-to-back transmission may be considered with respect to a Tx beam direction in addition to the time and frequency conditions of NR-U. The DG-PUSCH is incapable of being transmitted without LBT, when (i) there is a gap between the ending symbol of the CG-PUSCH and the starting symbol of the DG-PUSCH on the time axis, (ii) the bandwidth of the CG-PUSCH transmitted on the frequency axis and the bandwidth of the scheduled DG-PUSCH are not the same or the bandwidth to which the DG-PUSCH is allocated is not a subset of the bandwidth of the CG-PUSCH, or (iii) a beam direction indicated for the DG-PUSCH is not included in a Tx beam direction of the CG-PUSCH or the Tx beam direction indicated for the DG-PUSCH is not equal to the Tx beam direction of the CG-PUSCH. In order to secure an LBT gap before DG-PUSCH transmission, the UE may drop symbols of at least one last CG-PUSCH prior to symbol i of slot n located before scheduled DG-PUSCHs according to the mechanism of Clause 11.1 of 3GPP TS 38.213, as described in Clause 4.2.1.0.1 of 3GPP TS 37.213.

In addition, the same method may be applied even when the order of the CG-PUSCH and the DG-PUSCH is reversed, i.e., even in the case of DG-CG back-to-back transmission. In other words, when there is no time gap between the DG-PUSCH and the CG-PUSCH in a CG resource configured immediately after the DG-PUSCH and when the bandwidth of the DG-PUSCH and the bandwidth of the CG-PUSCH are the same or the bandwidth of the CG-PUSCH is included in the bandwidth of the DG-PUSCH, and when the Tx beam direction of the CG-PUSCH is included in the Tx beam direction of the DG-PUSCH or the Tx beam direction of the CG-PUSCH and the Tx beam direction of the DG-PUSCH are the same, the CG-PUSCH may be continuously transmitted immediately after DG-PUSCH transmission is ended without LBT. However, since the DG-PUSCH has a higher priority than the CG-PUSCH, when there is a time gap between the DG- PUSCH and the CG-PUSCH, the bandwidths of the DG-PUSCH and the CG-PUSCH are different, or Tx beam directions of the DG-PUSCH and the CG-PUSCH are different, the UE may give up CG-PUSCH transmission instead of dropping the symbol of the DG-PUSCH as in [Embodiment #2-2].

According to [Proposed Method #3], UL transmission may be performed through a space out of an interference region of a beam upon which LBT has already been performed, as described with reference to FIG. 8, by allowing continuous transmission between the CG-PUSCH and the DG-PUSCH through the same beam as the beam on which LBT is performed or a beam included in a beam region in which LBT is performed, so that interference with other radio nodes may be prevented. In addition, since random backoff-based LBT (e.g., Cat-3 LBT or Cat-4 LBT) for DG-PUSCH transmission need not to be performed, a transmission opportunity of the DG-PUSCH may be increased by preventing transmission failure and delay of the DG-PUSCH due to LBT failure.

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 14:
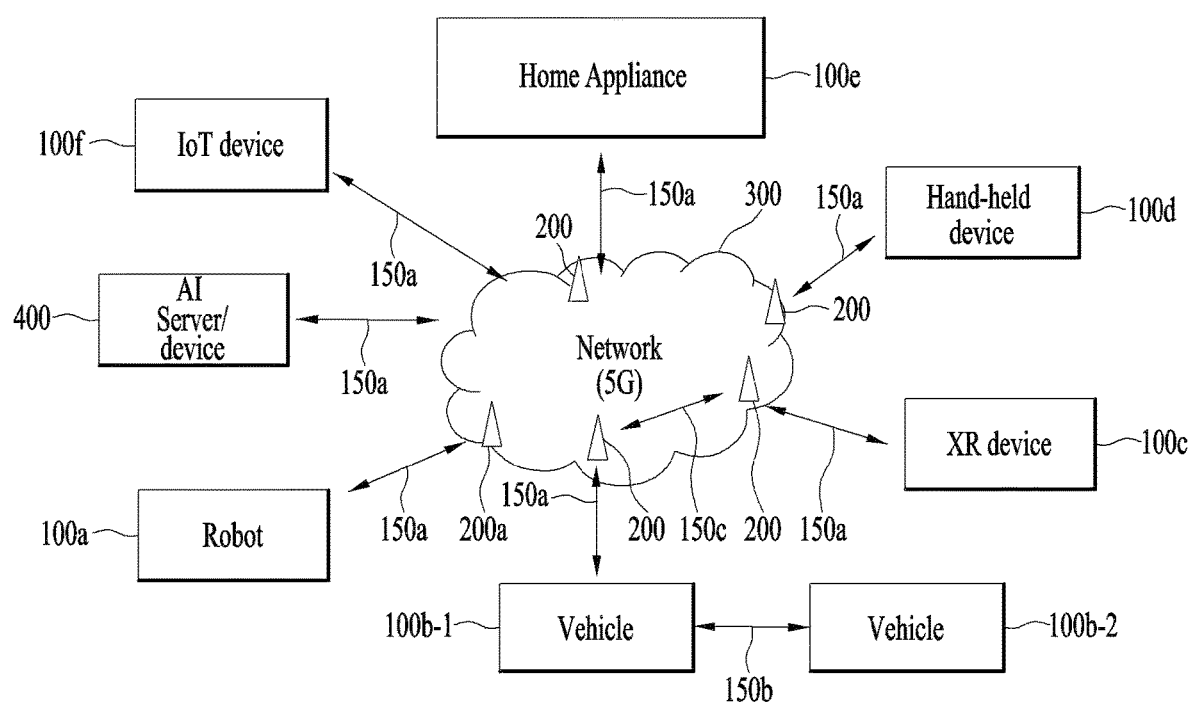
FIG. 14 illustrates an exemplary communication system applied to the present disclosure.

FIG. 14 illustrates a communication system 1 applied to the present disclosure.

Referring to FIG. 14, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100*a*, vehicles 100*b*-1 and 100*b*-2, an extended reality (XR) device 100*c*, a hand-held device 100*d*, a home appliance 100*e*, an IoT device 100*f*, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smartglasses), and a computer (e.g., a laptop). The home appliance may include a TV, a refrigerator, a washing machine, and so on. The IoT device may include a sensor, a smartmeter, and so on. For example, the BSs and the network may be implemented as wireless devices, and a specific wireless device 200*a* may operate as a BS/network node for other wireless devices.

The wireless devices 100*a* to 100*f* may be connected to the network 300 via the BSs 200. An AI technology may be applied to the wireless devices 100*a* to 100*f*, and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without intervention of the BSs/network. For example, the vehicles 100*b*-1 and 100*b*-2 may perform direct communication (e.g. V2V/vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, and 150*c* may be established between the wireless devices 100*a* to 100*f*/BS 200 and between the BSs 200. Herein, the wireless communication/connections may be established through various RATs (e.g., 5G NR) such as UL/DL communication 150*a*, sidelink communication 150*b* (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150*a*, 150*b*, and 150*c*. For example, signals may be transmitted and receive don various physical channels through the wireless communication/connections 150*a*, 150*b* and 150*c*. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Figure 15:
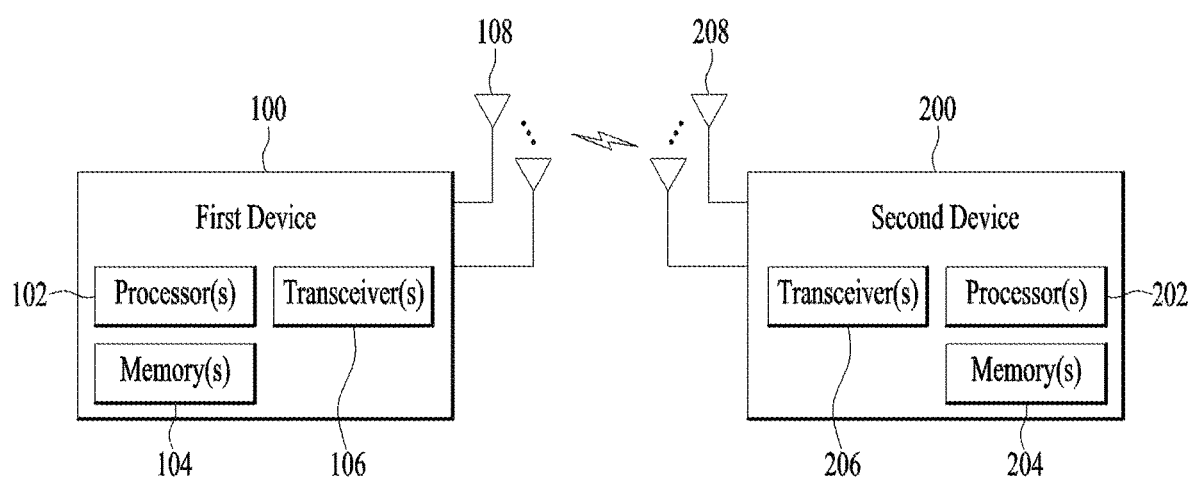
FIG. 15 illustrates an exemplary wireless device applicable to the present disclosure.

FIG. 15 illustrates wireless devices applicable to the present disclosure.

Referring to FIG. 15, a first wireless device 100 and a second wireless device 200 may transmit wireless signals through a variety of RATs (e.g., LTE and NR). {The first wireless device 100 and the second wireless device 200} may correspond to {the wireless device 100*x* and the BS 200} and/or {the wireless device 100*x* and the wireless device 100*x*} of FIG. 14.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

Specifically, instructions and/or operations, controlled by the processor 102 of the first wireless device 100 and stored in the memory 104 of the first wireless device 100, according to an embodiment of the present disclosure will be described.

Although the following operations will be described based on a control operation of the processor 102 in terms of the processor 102, software code for performing such an operation may be stored in the memory 104. For example, in the present disclosure, the at least one memory 104 may be a computer-readable storage medium and may store instructions or programs. The instructions or programs may cause, when executed, the at least one processor operably connected to the at least one memory to perform operations according to embodiments or implementations of the present disclosure, related to the following operations.

For example, the processor 102 may perform first sensing based on at least one first sensing beam. In this case, the at least one first sensing beam may be a beam that covers a plurality of Tx beams. One first sensing beam may cover all of the plural of Tx beams, or a plurality of first sensing beams may cover corresponding Tx beams, respectively.

In addition, the first sensing may be performed based on at least one of [Proposed Method #1] to [Proposed Method #3].

When it is determined that at least one of the plural Tx beams is idle in the first sensing, the processor 102 may perform second sensing based on at least one second sensing beam. In this case, the at least one second sensing beam may be a beam that covers the plural Tx beams. One second sensing beam may cover all of the plural Tx beams or a plurality of sensing beams may cover corresponding Tx beams, respectively.

The second sensing may be performed based on at least one of [Proposed Method #1] to [Proposed Method #3]. Meanwhile, performing the second sensing may be omitted when [Proposed Method #1] is implemented alone or when continuous transmission between a CG-PUSCH and a DG-PUSCH is allowed in [Proposed Method #3] (e.g., when conditions of [Embodiment #3-1] of [Proposed Method #3] are satisfied).

Based on at least one Tx beam being idle as a result of determination through the first sensing and/or the second sensing, the processor 102 may transmit, through the transceiver 106, at least one UL signal corresponding to a Tx beam determined to be idle. In this case, the UL signal transmitted by the processor 102 through the transceiver 106 may be based on at least one of [Proposed Method #1] to [Proposed Method #3].

In addition, the processor 102 may determine at least one Rx beam for receiving at least one DL signal through at least one Tx beam. The processor 102 may receive the at least one DL signal transmitted based on at least one of [Method #1] to [Method #3] through the at least one Rx beam.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Specifically, instructions and/or operations, controlled by the processor 202 of the second wireless device 100 and stored in the memory 204 of the second wireless device 200, according to an embodiment of the present disclosure will be described.

Although the following operations will be described based on a control operation of the processor 202 in terms of the processor 202, software code for performing such an operation may be stored in the memory 204. For example, in the present disclosure, the at least one memory 204 may be a computer-readable storage medium and may store instructions or programs. The instructions or programs may cause, when executed, the at least one processor operably connected to the at least one memory to perform operations according to embodiments or implementations of the present disclosure, related to the following operations.

For example, the processor 202 may perform first sensing based on at least one first sensing beam. In this case, the at least one first sensing beam may be a beam that covers a plurality of Tx beams. One first sensing beam may cover all of the plural of Tx beams, or a plurality of first sensing beams may cover corresponding Tx beams, respectively.

In addition, the first sensing may be performed based on at least one of [Proposed Method #1] and [Proposed Method #2].

When it is determined that at least one of the plural Tx beams is idle in the first sensing, the processor 202 may perform second sensing based on at least one second sensing beam. In this case, the at least one second sensing beam may be a beam that covers the plural Tx beams. One second sensing beam may cover all of the plural Tx beams or a plurality of sensing beams may cover corresponding Tx beams, respectively.

The second sensing may be performed based on at least one of [Proposed Method #1] and [Proposed Method #2]. Meanwhile, performing the second sensing may be omitted when [Proposed Method #1] is implemented alone.

Based on at least one Tx beam being idle as a result of determination through the first sensing and/or the second sensing, the processor 202 may transmit, through the transceiver 206, at least one DL signal corresponding to a Tx beam determined to be idle. In this case, the DL signal transmitted by the processor 102 through the transceiver 206 may be based on at least one of [Proposed Method #1] and [Proposed Method #2].

In addition, the processor 202 may determine at least one Rx beam for receiving at least one UL signal through at least one Tx beam. The processor 202 may receive the at least one UL signal transmitted based on at least one of [Method #1] and [Method #2] through the at least one Rx beam.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Figure 16:
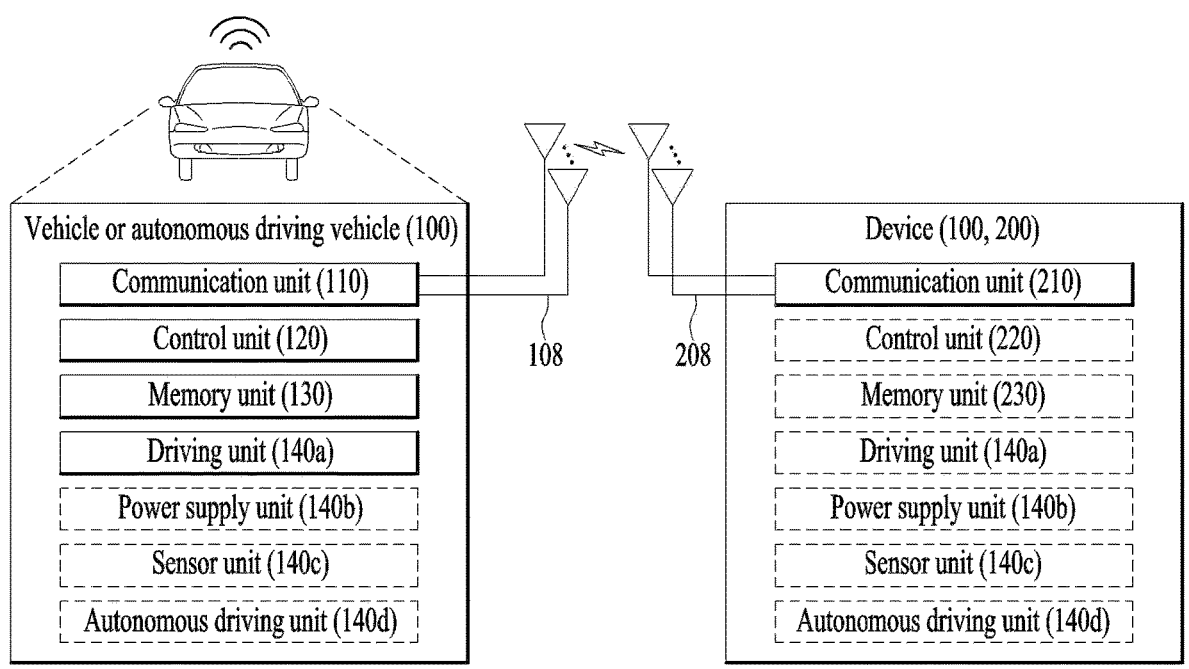
FIG. 16 illustrates an exemplary vehicle or autonomous driving vehicle applicable to the present disclosure.

FIG. 16 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 16, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140*a* may enable the vehicle or the autonomous driving vehicle 100 to drive on a road. The driving unit 140*a* may include an engine, a motor, a powertrain, a wheel, a brake, a steering device, and so on. The power supply unit 140*b* may supply power to the vehicle or the autonomous driving vehicle 100 and include a wired/wireless charging circuit, a battery, and so on. The sensor unit 140*c* may acquire information about a vehicle state, ambient environment information, user information, and so on. The sensor unit 140*c* may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140*d* may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140*d* may generate an autonomous driving route and a driving plan from the obtained data. The control unit 120 may control the driving unit 140*a* such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140*c* may obtain information about a vehicle state and/or surrounding environment information. The autonomous driving unit 140*d* may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

The embodiments of the present disclosure described herein below are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present disclosure or included as a new claim by a subsequent amendment after the application is filed.

In the present disclosure, a specific operation described as performed by the BS may be performed by an upper node of the BS in some cases. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

While the above-described method of transmitting and receiving a signal in an unlicensed band and an apparatus therefor have been described based on an example applied to a 5G NR system, the method and apparatus are applicable to various wireless communication systems in addition to the 5G NR system.

What is claimed is:

1. A method of performing an uplink (UL) transmission by a user equipment (UE) in a wireless communication system, the method comprising:

performing sensing on beams, simultaneously, based on a sensing duration, wherein each of the beams is sensed independently, and counter values for the beams are set and each of the counter values is independently counted to determine whether a beam corresponding to each of the counter values is idle;

performing UL transmissions corresponding to beams sensed to be idle among the beams, wherein the UL transmissions start at the same transmission time across the beams sensed to be idle, wherein the performing sensing on the beams comprises:

performing a first type sensing on a first beam, wherein, after the first beam among the beams is sensed to be idle based on the first type sensing, an UL transmission corresponding to the first beam is not performed until the same transmission time; and performing second type sensing on the first beam during a duration immediately before the same transmission time, and wherein the performing the UL transmissions comprises:

performing the UL transmission corresponding to the first beam based on that the first beam is sensed to be idle based on the second type sensing.

2. The method of claim 1, wherein the first type sensing is based on a random back-off counter, and wherein the second type sensing is not based on the random back-off counter.

3. The method of claim 1, further comprising:

based on the first beam being sensed to be busy based on the second type sensing, performing the first type sensing on the first beam.

4. A user equipment (UE) for performing an uplink (UL) transmission in a wireless communication system, the UE comprising:
   at least one transceiver;
   at least one processor; and
   at least one memory operably connected to the at least one processor and configured to store instructions that, when executed, cause the at least one processor to perform operations comprising:
   performing sensing on beams, simultaneously, based on a sensing duration,
   wherein each of the beams is sensed independently, and wherein counter values for the beams are set and each of counter values is independently counted to determine whether a beam corresponding to each of the counter values is idle;
   performing, through at least one transceiver UL transmissions corresponding beams sensed to be idle among the beams,
   wherein the UL transmissions start at the same transmission time across the beams sensed to be idle,
   wherein the performing sensing on the beams comprises:
      performing a first type sensing on a first beam, wherein, after the first beam among the beams is sensed to be idle based on the first type sensing, an UL transmission corresponding to the first beam is not performed until the same transmission time; and
      performing second type sensing on the first beam during a duration immediately before the same transmission time, and
   wherein the performing the UL transmissions comprises:
      performing the UL transmission corresponding to the first beam based on that the first beam is sensed to be idle based on the second type sensing.

5. The UE of claim 4, wherein the first type sensing is based on a random back-off counter, and
   wherein the second type sensing is not based on the random back-off counter.

6. The UE of claim 4, further comprising:
   based on the first beam being sensed to be busy based on the second type sensing, performing the first type sensing on the first beam.

7. A method of performing a downlink (DL) transmission by a base station (BS) in a wireless communication system, the method comprising:
   performing sensing on beams, simultaneously, based on a sensing duration,
   wherein each of the beams is sensed independently, and counter values for the beams are set and each of the counter values is independently counted to determine whether a beam corresponding to each of the counter values is idle;
   performing DL transmissions corresponding to beams sensed to be idle among the beams,
   wherein the DL transmissions start at the same transmission time across the beams sensed to be idle,
   wherein the performing sensing on the beams comprises:
      performing a first type sensing on a first beam, wherein, after the first beam among the beams is sensed to be idle based on the first type sensing, a DL transmission corresponding to the first beam is not performed until the same transmission time; and
      performing second type sensing on the first beam during a duration immediately before the same transmission time, and wherein the performing the DL transmissions comprises:
      performing the DL transmission corresponding to the first beam based on that the first beam is sensed to be idle based on the second type sensing.

8. The method of claim 7, wherein the first type sensing is based on a random back-off counter, and
   wherein the second type sensing is not based on the random back-off counter.

9. A base station (BS) for performing a downlink (DL) transmission in a wireless communication system, the BS comprising:
   at least one transceiver;
   at least one processor; and
   at least one memory operably connected to the at least one processor and configured to store instructions that, when executed, cause the at least one processor to perform operations comprising:
   performing sensing on beams, simultaneously, based on a sensing duration,
   wherein each of the beams is sensed independently, and counter values for the beams are set and each of the counter values is independently counted to determine whether a beam corresponding to each of the counter values is idle;
   performing, through the at least one transceiver, DL transmissions corresponding to beams sensed to be idle among the beams,
   wherein the DL transmissions start at the same transmission time across the beams sensed to be idle,
   wherein the performing sensing on the beams comprises:
      performing a first type sensing on a first beam, wherein, after the first beam among the beams is sensed to be idle based on the first type sensing, a DL transmission corresponding to the first beam is not performed until the same transmission time; and
      performing second type sensing on the first beam during a duration immediately before the same transmission time, and wherein the performing the DL transmissions comprises:
      performing the DL transmission corresponding to the first beam based on that the first beam is sensed to be idle based on the second type sensing.

10. The BS of claim 9, wherein the first type sensing is based on a random back-off counter, and
    wherein the second type sensing is not based on the random back-off counter.

* * * * *